(12) United States Patent
Oetringer

(10) Patent No.: US 8,190,542 B2
(45) Date of Patent: May 29, 2012

(54) NEURAL NETWORK, A DEVICE FOR PROCESSING INFORMATION, A METHOD OF OPERATING A NEURAL NETWORK, A PROGRAM ELEMENT AND A COMPUTER-READABLE MEDIUM

(75) Inventor: Eugen Oetringer, Papendrecht (NL)

(73) Assignee: ComDys Holding B.V., Papendrecht (NL)

( * ) Notice: Subject to any disclaimer, the term of this patent is extended or adjusted under 35 U.S.C. 154(b) by 939 days.

(21) Appl. No.: 12/089,535

(22) PCT Filed: Sep. 27, 2006

(86) PCT No.: PCT/EP2006/009402
§ 371 (c)(1),
(2), (4) Date: Sep. 2, 2008

(87) PCT Pub. No.: WO2007/042148
PCT Pub. Date: Apr. 19, 2007

(65) Prior Publication Data
US 2008/0319934 A1    Dec. 25, 2008

Related U.S. Application Data

(60) Provisional application No. 60/724,482, filed on Oct. 7, 2005.

(30) Foreign Application Priority Data

Oct. 7, 2005 (EP) .................................... 05021910

(51) Int. Cl.
*G06E 1/00* (2006.01)
*G06F 15/18* (2006.01)

(52) U.S. Cl. ............................... 706/31; 706/20; 706/15

(58) Field of Classification Search .................. None
See application file for complete search history.

(56) References Cited

U.S. PATENT DOCUMENTS 5,283,839 A * 2/1994 Edelman et al. .............. 382/103
(Continued)

FOREIGN PATENT DOCUMENTS

JP    EP1262912 A2    4/2002
WO    WO2004048513 A2    6/2004

OTHER PUBLICATIONS

Oetringer et al., E., "How Autism Symptoms Could Develop at the Neuron Level—An Information Management Perspective", BMC Neuroscience, p. 1, 2009.*

(Continued)

*Primary Examiner* — Alan Chen
*Assistant Examiner* — Adrian Kennedy
(74) *Attorney, Agent, or Firm* — Robert A. Blaha; Smith Risley Tempel Santos LLC

(57) ABSTRACT

A neural network includes neurons and wires adapted for connecting the neurons. Some of the wires comprise input connections and exactly one output connection and/or a part of the wires comprise exactly one input connection and output connections. Neurons are hierarchically arranged in groups. A lower group of neurons recognizes a pattern of information input to the neurons of this lower group. A higher group of neurons recognizes higher level patterns. A strength value is associated with a connection between different neurons. The strength value of a particular connection is indicative of a likelihood that information which is input to the neurons propagates via the particular connection. The strength value of each connection is modifiable based on an amount of traffic of information which is input to the neurons and which propagates via the particular connection and/or is modifiable based on a strength modification impulse.

18 Claims, 26 Drawing Sheets

U.S. PATENT DOCUMENTS

| | | |
|---|---|---|
| 5,640,494 A | 6/1997 | Jabri et al. |
| 5,729,623 A | 3/1998 | Omatu et al. |
| 6,026,178 A | 2/2000 | Toda |
| 7,426,501 B2 * | 9/2008 | Nugent ............................ 706/26 |
| 2002/0038294 A1 * | 3/2002 | Matsugu ......................... 706/20 |
| 2003/0004907 A1 * | 1/2003 | Matsugu ......................... 706/26 |
| 2003/0115165 A1 | 6/2003 | Hoya |

OTHER PUBLICATIONS

Oetringer et al., E., "Fundamental Principles by Which the Brain Could Process Information—An Information Management Perspective", BMC Neuroscience, p. 1, 2009.*

* cited by examiner

Fig.18I (The figure is a rotated table labeled "Pattern File" with columns including Pattern Type, Pattern description, Record Number, Patterns (I: Input, O: Output, Obj: Objective, V: Value, Im: Imagination), Temporary Links (Inter-est, Emotion), Links to other Patterns (record numbers) with Branch 1 through Branch 7 each paired with Strength. Contents as legible:)

| Pattern Type | Pattern description | Record Number | Patterns | | Inter-est | Emotion | Branch 1 | Strength | Branch 2 | Strength | Branch 3 | Strength | Branch 4 | Strength | Branch 5 | Strength | Branch 6 | Strength | Branch 7 |
|---|---|---|---|---|---|---|---|---|---|---|---|---|---|---|---|---|---|---|---|
| Emotion type (those positive to most negative) | Interest -J | 171 | | 2 V | | | 3469 Objective 2 | | | | | | | | | | | | |
| | Interest -I | 172 | | 1 V | | | 4333 Objective 7 | | | | | | | | | | | | |
| | Intense love | 173 | | 120 V | | | 8754 Intense love feeling | | | | | | | | | | | | |
| | love | 174 | | 90 V | | | 6903 love feeling | | | | | | | | | | | | |
| | Success – High (i.e. University finished) | 175 | | 80 V | | | 8743 Feeling +7 | | | | | | | | | | | | |
| | success, brief but intense | 176 | | 60 V | | | 8744 Feeling +6 | | | | | | | | | | | | |
| | Very pleasant | 177 | | 55 V | | | 212 Feeling +4 | | | | | | | | | | | | |
| | some success | 178 | | 25 V | | | 8746 Feeling +4 | | | | | | | | | | | | |
| | recognition by boss | 179 | | 10 V | | | 8747 Feeling +3 | | | | | | | | | | | | |
| | "Well was nice" | 180 | | 5 V | | | 8748 Feeling +2 | | | | | | | | | | | | |
| | minimum positive | 181 | | 1 V | | | 8749 Feeling +1 | | | | | | | | | | | | |
| | minimum negative | 182 | | -1 | | | 6576 Just a negative feeling | | | | | | | | | | | | |
| | "Just unpleasant" | 183 | | -6 V | | | 167 unpleasant feeling | | | | | | | | | | | | |
| | unpleasant | 184 | | -15 V | | | 166 rather unpleasant feeling | | | | | | | | | | | | |
| Feeling | very unpleasant | 185 | | -45 V | | | 169 some unpleasant feeling | | | | | | | | | | | | |
| | extreme "alarm bells" | 186 | | -75 V | | | 190 "alarm bells" | | | | | | | | | | | | |
| | unpleasant feeling | 187 | | 0 O | | | 8357 negative feeling NF0 | | | 8575 blood pressure up | | 7081 "stomach feeling" | | (and so forth) | | | | | | |
| | rather unpleasant feeling | 188 | | 0 O | | | 4983 negative feeling NF1 | | | 6109 sweat | | 8575 blood pressure up | | (and so forth) | | | | | | |
| | some "alarm bells" | 189 | | 0 O | | | 4984 negative feeling NF2 | | | 9085 sweat | | (and so forth) | | | | | | | | |
| | "alarm bells" | 190 | | 0 O | | | 4985 negative feeling NF3 | | | | | (and so forth) | | | | | | | | |
| Sensory data | hunger | 191 | | 9999 I | 23.7 | | 8754 hunger feeling | | | | | | | | | | | | |
| | thirst | 192 | | 9099 I | 23.7 | | 7459 thirst feeling | | | | | | | | | | | | |
| | | 193 | | 89999 I | 35.1 | | 196 heart rate normal | | 201 breathing min/max | | (and so forth) | | | | | | | | |
| | maximum energy demand level x | 194 | | 87659 I | 29.1 | | 197 heart up | | 202 breathing rate up | | (and so forth) | | | | | | | | |
| | average demand level x | 195 | | 95764 I | 26.4 | | 199 heart rate down | | 203 breathing rate down | | (and so forth) | | | | | | | | |
| | energy demand level x2 | 188 | | 99999 O | 29.4 | | | | | | | | | | | | | | |

NEURAL NETWORK, A DEVICE FOR PROCESSING INFORMATION, A METHOD OF OPERATING A NEURAL NETWORK, A PROGRAM ELEMENT AND A COMPUTER-READABLE MEDIUM

CROSS REFERENCE TO RELATED APPLICATION

This application claims the benefit of the filing date of European Patent Application No. 05021910 filed Oct. 7, 2005, and of U.S. Provisional Patent Application No. 60/724,482 filed Oct. 7, 2005, the disclosure of which is hereby incorporated herein by reference.

TECHNICAL FIELD

The invention relates to a neural network.

Beyond this, the invention relates to a device for processing information.

The invention further relates to a method of operating a neural network.

Moreover, the invention relates to a program element.

Further, the invention relates to a computer-readable medium.

BACKGROUND

A neural network is an interconnected group of artificial or biological neurons. It is possible to differentiate between two groups of neural networks: On the one hand biological neural networks, for example the human brain or parts thereof. On the one hand artificial neural networks which refer to electrical, mechanical or computational simulations or models of biological neural networks. There exist hybrids, incorporating biological neurons as part of electronic circuits.

Over the previous decades, computers and software have made great advancement. However and despite large investments, there are areas in which the human mind is far more efficient than a computer. For example, a human mind is able to instantly identify all sorts of objects, to speak fluently or to walk over all sorts of terrains.

"On Intelligence", Jeff Hawkins, Sandra Blakeslee, 2004, Times Books, Henry Holt and Company, ISBN 0-8050-7456-2, particularly pp. 106 to 176, discloses that the human brain works fundamentally different than a computer. Hawkins et al. introduce a framework on how the human brain might function.

SUMMARY

It is an object of the invention to provide an efficient neural network.

A neural network, a device for processing information, a method of operating a neural network, a program element and a computer-readable medium are provided. In one embodiment, a neural network includes neurons, wires adapted for connecting the neurons, a processor arranged to receive outputs from the neurons and a memory coupled to the processor. At least a part of the wires comprises input connections and exactly one output connection and/or at least a part of the wires comprises exactly one input connection and a plurality of output connections. The neurons are grouped to at least two groups of neurons to define a hierarchic structure, a lower group of neurons of a lower hierarchic level is adapted to recognize a pattern of information which is input to the neurons of this lower group and which pattern is of a lower level compared to a pattern to be recognized by neurons of a higher group of neurons of a higher hierarchic level. The wires are grouped to at least two groups of wires as bunches of wires, with neurons of a respective group of neurons connected between two groups of wires. A strength value is generated in the processor, associated with a connection between different neurons, and stored in the memory. The strength value of a particular connection is indicative of a likelihood that information which is input to the neurons propagates via the particular connection. The strength value of each connection is modifiable based on an amount of traffic of information which is input to the neurons and which propagates via the particular connection and/or is modifiable based on a strength modification impulse. At least a part of the neurons of a respective group of neurons are interconnected to one another by means of connections.

According to an exemplary embodiment of the invention, a neural network is provided, comprising a plurality of neurons and a plurality of wires adapted for connecting the plurality of neurons, wherein at least a part of the plurality of wires comprises a plurality of input connections and exactly one output connection.

According to a further exemplary embodiment of the invention, a device for processing information is provided, the device comprising an input unit for perceiving information, a neural network having the above-mentioned features for processing the perceived information, and a decision taking unit (preferably located at a central position of the system) for taking a decision based on a result of the processing of the perceived information.

According to another exemplary embodiment of the invention, a method of operating a neural network is provided, the method comprising connecting a plurality of neurons by a plurality of wires, wherein at least a part of the plurality of wires comprises a plurality of input connections and exactly one output connection.

According to still another exemplary embodiment of the invention, a program element is provided, which, when being executed by a processor, is adapted to control or carry out a method having the above-mentioned features.

According to yet another exemplary embodiment of the invention, a computer-readable medium (e.g. a CD, a DVD, a USB stick, a floppy disk or a harddisk) is provided, in which a computer program is stored which, when being executed by a processor, is adapted to control or carry out a method having the above-mentioned features.

According to still another exemplary embodiment of the invention, a neural network is provided, comprising a plurality of neurons, and a plurality of wires adapted for connecting the plurality of neurons, wherein at least a part of the plurality of wires comprises exactly one input connection and a plurality of output connections.

The neural network according to embodiments of the invention can be realized by a computer program, that is by software, or by using one or more special electronic, optical and/or optoelectronic optimization circuits, that is in hardware (for instance including one or more microprocessors), or in hybrid form, that is by means of software components and hardware components.

According to an exemplary embodiment of the invention, a neural network is provided in which multiple nodes or neurons are connected to one another and may be further coupled with bunches of wires having a multitude of input connections but only one output connection. This fundamental structure is a proper basis for an adaptive system which may be capable to learn, in a human-similar manner, to derive information by processing input content.

In other words, a neural network having the above-mentioned features may be fed with information, and the interconnected neurons may adjust strength values of their interconnections based on the learnt information so as to be able to recognize or remember or compare known patterns in the future, and to take decisions based on the learnt information. By means of the multiple input connections of the wires, even a complex structure may be mapped, wherein the single output connection allows the neural network to take reliable decisions and judge path along which information shall flow.

Alternatively, a proper function may also be obtained with a system having exactly one input connection and a plurality of output connections.

With a system according to an exemplary embodiment of the invention, sophisticated decision making or artificial intelligence may be made possible, and a system may be provided which works properly also in a complex environment. By means of parallel processing along different paths of the interconnected structures, it may be possible to take decisions in a reasonable number of steps (for instance with 100 or 200 steps) so as to derive information with reasonable computational burden and in a sufficiently fast manner.

This can be achieved by a combination of a strength management, that is a flexible adjustment of strength values for different connections between the neurons, by a special kind of learning, and by prioritizing tasks which have assigned a higher value of priority.

When information is input to the system, for instance visual, audible or olfactory information, then this information is recognized in form of patterns. For instance, when a camera of the system detects an image of a human being, such a pattern may help to identify the human being by name.

Thus, universal patterns may be recognized, wherein patterns of a lower level may be identified by groups of neurons supplied with input information (in the above example information obtained by sensors like the camera), and groups of neurons of a higher level may recognize, based on these low level patterns, patterns of a higher order of complexity or abstraction. By taking this measure, various input information items may be processed in a human-similar manner and may form the source for deriving an abstract information which in turn can be used as a basis for taking a human-similar decision.

Areas in which the human mind is conventionally far more efficient than a computer might be interesting fields of applying embodiments of the invention. In this context, embodiments of the invention may provide a building block that should, together with additional building blocks, lead into substantial improvements with computers. Embodiments of the invention extend and further develop the above mentioned framework of Hawkins et al. to provide a method for the identification of higher-level patterns, association techniques and the management thereof.

According to an exemplary embodiment, a method and a system for the identification (or recognition) of patterns, associations of patterns and the management of patterns is provided.

At least one of the following elements may be included in a system according to an exemplary embodiment:

Lower-level patterns (for example: points, lines, rectangles, colours, etc.)

Higher-level patterns, created from lower-level patterns (for example: doors, cars, faces, words, muscle activation in humans, etc.)

A switching area that connects the patterns with each other

A central or software area that can take decisions

The strength of the individual patterns

The strength of the links in the switching area

Neuron-similar functionality to establish circuits

Circuits

Large scale parallel activity.

Supported by some software type of functionality, exemplary embodiments of the invention provide at least one of the following functionality items:

The identification of new patterns from lower-level patterns and from higher-level patterns (the identification of lower-level patterns may or may not require additional/different functionality)

The establishment of meaning through circuits connecting individual patterns

The establishment of sequences through the order of the patterns within a circuit The establishment of preferred options through a strength management The freeing up of the patterns and circuits of least relevance.

The following are advantages which may be achieved by exemplary embodiments of the invention:

In the context of a hardware implementation of the invention, large scale parallel processing may become possible without the intervention of a central processor. Input patterns (i.e. from visual objects) can automatically lead to output pattern (i.e. a movement). Software can simulate or substitute the hardware implementation. In that case, interaction with a central processor may be required or advantageous. However, the decision making from input patterns to output patterns may be very similar to the hardware implementation.

A human-similar learning may be possible

Often, input patterns lead to output patterns within less than 100 steps involved (which is a fraction of what conventional computer programs with underlying microcode need); though, many things happen in parallel Embodiments of the invention provide a fundamental building block to make computers do things only humans do well up to today (i.e. walking over all sorts of terrain; natural language interface; catching a ball; etc.).

In the following, advantageous features of embodiments of the invention will be explained:

New, overarching patterns may be created from existing patterns (a learning mechanism for the creation of overarching patterns).

Patterns may be associated with each other, for example, to create meaning (a learning of meaning can be established).

"Multiple incoming connections" to a wire within the bunch of wires may be provided, but only "one outgoing connection" to only one pattern may provide the functionality to associate varying patterns with a single object. The strength of these connections may provide the preferred choices.

Patterns and associations may be managed in a way such that, for example, the more relevant associations and/or patterns become preferred choices and the least relevant associations and/or patterns can be removed or eliminated to free up space for new patterns and circuits.

Multiple to a rather large number of activities can happen at the same time (parallel processing). Parallel processing can happen without intervention from a central place. Input criteria (i.e. patterns) can automatically lead to output, for example, the activation of something.

Input patterns can lead to output patterns within 100 or less steps, which is a fraction of the steps needed by computers with today's architecture to do the same task (parallel activity counts for one step). Though, for better decision making, as appropriate and with technology that works faster than the neurons of the human brain, exemplary applications may use a multitude of 100 steps.

A building block enabling the creation of natural language interfaces may be provided, providing robots capable to walk over a multitude of terrains, etc. (what humans do with ease but conventional computers/robots struggle with).

Sequences may be established through the order of patterns within a circuit.

Next, further exemplary embodiments of the invention will be described.

In the following, exemplary embodiments of the neural network will be described. However, these embodiments also apply for the device for processing information, for the method of processing audio data, for the program element and for the computer-readable medium.

The plurality of neurons may be grouped to at least two groups of neurons, wherein the groups of neurons may be arranged to define a hierarchic structure. By introducing a hierarchy in the grouped neurons, different levels of abstraction or pattern recognition can be distinguished and can be connected in series/in parallel. Thus, a structured arrangement of the interconnected neurons may be obtained.

The plurality of wires may be grouped to at least two groups of wires (which may also be denoted as bunches of wires), wherein neurons of a respective group of neurons may be connected between two (adjacent) groups of wires. Thus, between different levels or hierarchical orders of neural clusters, bunches of wires may be interconnected. Hence, a sequence of alternating neuron portions and connecting portions may be formed, so that a group of wires may be a powerful interface between different groups of neurons or may provide a communication between groups of neurons (see FIG. 2).

At least a part of the neurons of a respective group of neurons may be interconnected to one another. Thus, the neurons may be interconnected to one another by intra-neuronal connection lines and/or may be interconnected to wires.

A group of neurons of a lower hierarchic level may be adapted to recognize a pattern of information input to the neurons of this group which pattern is of a lower level compared to a pattern to be recognized by neurons of a group of neurons of a higher hierarchic level. For instance, a pattern of a lower level may be the extraction of a face from a person's image captured by a camera. In contrast to this, a pattern of a higher level may be the identification of the name of the person visible on the image. For instance, on such a higher level, the name of a person may be identified based on the detected image and based on a voice recognition system detecting a wife of the person calling the person "Jim". In combination with the detection that the person has red hair, blue eyes and wears a watch of a particular brand, the system may derive the higher-level pattern information that the person might be "Jim Smith".

In a further high level, it may be, for instance, identified that the identified person appears on the image in combination with other persons, for instance with his family members. By this subsequent refinement of the pattern or information, a human-similar decision making may be accomplished which may allow for producing intelligent machines or the like. Thus, the information of the other people on the image may confirm that the person is in fact "Jim Smith".

A strength value may be associated with each connection between different neurons, wherein the strength value of a particular connection may be indicative of a probability that information input to the neurons propagates via the particular connection. In other words, the strength value assigned to a connection may define whether a particular piece of information or a signal is transmitted via this connection or via another connection having a different (higher) strength value. For instance, a propagation path may be activated and used which has, when taken alone or in combination with other connections, the highest strength value available.

The strength value of each connection may be modified based on a frequentness of propagation of information input to the neurons via the particular connection and/or may be modified based on a strength modification impulse. Thus, the frequency of occurrence of a propagation via a particular connection may be a criteria based on which the strength value is determined. For instance, frequent use of a connection may increase the strength value, and seldom use of a connection may have the consequence that the corresponding strength value remains low or is even reduced. By this flexibility of the strength value it may be ensured that the system learns from the information which is supplied to the system. The strength value of each connection may also be modified based on a strength modification impulse. For instance, a strength increase impulse may be generated. The strength of a connection may be increased through each re-activation of the circuit or through special impulses, which can be based on value patterns.

The strength value of each connection may decrease in case of absence of a propagation of information input to the neurons via the particular connection for more than a predetermined time interval. In other words, when a connection has not been used for at least a predetermined time interval, then the corresponding strength value may be reduced automatically, since this connection has a high probability to be of lower relevance. Furthermore, for each use of a connection, the corresponding strength value may be increased. As an alternative to a step-wise ("digital") decrease of the strength value of connections of low relevance, a smooth (constant) decrease is possible (i.e. through something physical or biological).

The plurality of neurons may be adapted such that a signal to be sent by a neuron is sent via a connection of the neuron which connection has assigned the highest strength value as compared to the remaining connections of the neuron. According to this feature, the determination which of a plurality of connection will be used for sending a signal is performed on the basis of the fact which of the connections provides the highest strength value. This feature may improve the adaptive capabilities of the system.

The strength value of a connection may be maintained permanently at least at a predetermined value in case that the strength value reaches or exceeds the predetermined value. In other words, when the strength value has exceeded a certain level for a connection, then this connection might be of high relevance and should be prevented from being weakened or removed (for instance since this connection has not been used for a particular time interval). In order to avoid such an unwanted reduction or elimination of important key paths, very strong paths may be prevented from being weakened according to the described embodiment.

A particular connection may be interruptible in case that a frequentness of propagation of information input to the neurons via the particular connection falls below a threshold value. For instance, when the strength value becomes very small, such an obviously irrelevant connection may be deleted.

The previously described features, when taken alone or in combination, may enable to provide a high performance adaptive system in which reasonable assumptions are taken based on which connection strengths are modified.

The plurality of neurons may be connected in such a manner to allow for a parallel processing of information input to the neurons.

The plurality of neurons may be connected in a manner to allow for a parallel processing of information by the neurons. Such a parallelization or decentralization of data processing may significantly improve the speed of the data processing, and may distribute the resources homogeneously.

Each of the neurons may comprise at least one incoming interface adapted to receive information. The neurons may also have a plurality of incoming interfaces via which an incoming signal or piece of information may be transported to the neuron.

Furthermore, each of the neurons may comprise at least one outgoing interface adapted to send information. Thus, a neuron can send, via one or more outgoing channels, information which shall be propagated to another neuron.

At least one of the plurality of neurons may be connected to at least one of the plurality of wires, wherein exactly one of these connections may be active at a time. Such a neuron may also be denoted as a single tree neuron having many connections into the bunch of wires but only one or at most one connection being active at any time.

At least one of the plurality of neurons may be connected to at least two of the plurality of wires, wherein more than one of these connections are active simultaneously. Such a neuron may also be denoted as a multiple tree neuron which can be active in parallel and can establish multiple circuits.

At least one of the plurality of neurons may be disabled by default and is to be enabled (only) upon receipt of an enabling signal. Such a neuron may also be denoted as a bridge neuron which is usually disabled and provides connectivity to an association area below. By a so-called "open" frequency, the bridge neuron may be enabled, wherein the bridge neuron may, in the active state, fire, to activate a circuit it is part of.

At least one of the plurality of neurons may be adapted to detect an incoming information and to send the enabling signal upon receipt of the incoming information. Such a neuron may also be denoted as a frequency neuron which detects activity at its incoming wire and sends an "open" frequency signal.

At least one of the plurality of neurons may be enabled by default and is to be disabled (only) upon receipt of a disabling signal. Such an inhibition neuron being enabled by default may be disabled by a "no" frequency signal.

At least one of the plurality of neurons or at least one circuit formed by at least two of the plurality of neurons may be adapted to identify a pattern based on received information.

At least one of the plurality of neurons may be adapted to identify a pattern based on the received information. Such a (T)-neuron may connect to a central place for the purpose of identifying the pattern that is currently "on". This information can be used for decision making.

Referring to the previously described embodiments, the provision of different types of neurons may allow to have a powerful system in which each of the neurons is selectively adapted to fulfil its assigned functions and tasks. Thus, such a multi-neuron type system allows, with reasonable computational burden, to derive information in an efficient manner.

Different groups of neurons may be assigned to process information related to for instance different human senses. For instance, a first group of neurons may be provided and interconnected so as to evaluate visual information. Another group of neurons may be provided for processing audible information. A third group of neurons may be provided for analyzing olfactory information, for instance smells and tastes. The data related to the human senses may be detected, in the system of the invention, by means of respective sensors which may simulate corresponding human senses.

A "sense" in the meaning of this description may be any human physiological perception that responds to a specific kind of physical energy and corresponds to a defined region or group of regions within the brain where the signals are received and interpreted. Human senses which may be simulated by the invention are particularly seeing, hearing, tasting, smelling, tactition, thermoception, nociception, equilibrioception and proprioception. Seeing or vision describes the ability to detect light. Hearing or audition is the sense of sound perception. Taste or gustation relates to the human tongue having receptors to detect tastes like sweet, salt, sour and bitter. Smell or olfaction relates to olfactory reception neurons. Tactition is the sense of pressure perception, generally in the skin. Thermoception is the sense of heat and cold, also by the skin. Nociception is the perception of pain. Equilibrioception is the perception of balance. Proprioception is the perception of body awareness. A plurality of these human senses in any combination may be used as input information for the neural network from which the artificial system of the invention may derive information and may take a "reasonable" decision. For each of the discussed senses, technical solutions are available to detect the respective perception. A "sense" in the meaning of this description may also be any non-human perception of a sensor device, for instance electricity, magnetism, radioactivity, computer input (also from one computer to another) or the like.

Different groups of neurons may be assigned to process information related to different levels of patterns. A lower level pattern may include points, lines, rectangles, colours, etc. Higher level patterns may be created from lower level patterns. Examples for higher level patterns are doors, cars, faces, words, muscle activation in humans.

At least one of the plurality of neurons may be adapted to sense at least one of the signals of the group consisting of a signal to activate a circuit formed by at least two of the plurality of neurons, a signal to deactivate a circuit formed by at least two of the plurality of neurons, and a signal to connect different circuits each formed by at least two of the plurality of neurons.

In the following, further exemplary embodiments of the device for processing information will be described. However, these embodiments also apply for the neural network, the method of operating a neural network, the program element and the computer-readable medium.

The input unit of the device may be adapted for perceiving information related to one or a plurality of different human senses or non-human senses. For instance, the input unit may include a camera for detecting visual information, may include a microphone for detecting audible information, may comprise a gas sensor for detecting olfactory information, may comprise a pressure sensor for detecting tactile information, etc. These information items may be pre-processed, for instance by an image processing algorithm, a speech recognition algorithm, a gas separation identification unit (for instance a mass spectroscopy or the like), a pressure determining device or the like. This information may then be provided to the neural network for further processing and interpretation. "Non-human senses" may particularly denote senses which can be perceived by a sensor device, but not necessarily by a human being (for instance electricity or magnetism or radioactivity).

The decision taking unit (which may also be denoted as a central processing unit) may be adapted for taking the decision based on a result of a processing of perceived information related to one or a plurality of different human senses or non-human senses. For instance, similar like a human sense organ in combination with the human brain, the device for processing information may derive information and may take decisions based on the processing of the neural network.

Particularly, the decision taking unit may be adapted to take a human-similar decision based on a result of the processing of the perceived information.

The decision taking unit of the device may be adapted for taking the decision at a central place of the device or at a central place of the neural network.

The device may further comprise an output unit adapted to output a result and/or to perform an action based on the decision.

The device may further comprise an output unit adapted to output a result (e.g. "the detected person is Mr. Brown") and/or to take a measure (e.g. "open the door for Mr. Brown") based on the decision.

The aspects defined above and further aspects of the invention are apparent from the examples of embodiment to be described hereinafter and are explained with reference to these examples of embodiment.

BRIEF DESCRIPTION OF THE FIGURES

The invention will be described in more detail hereinafter with reference to examples of embodiment but to which the invention is not limited.

Figure 28A:
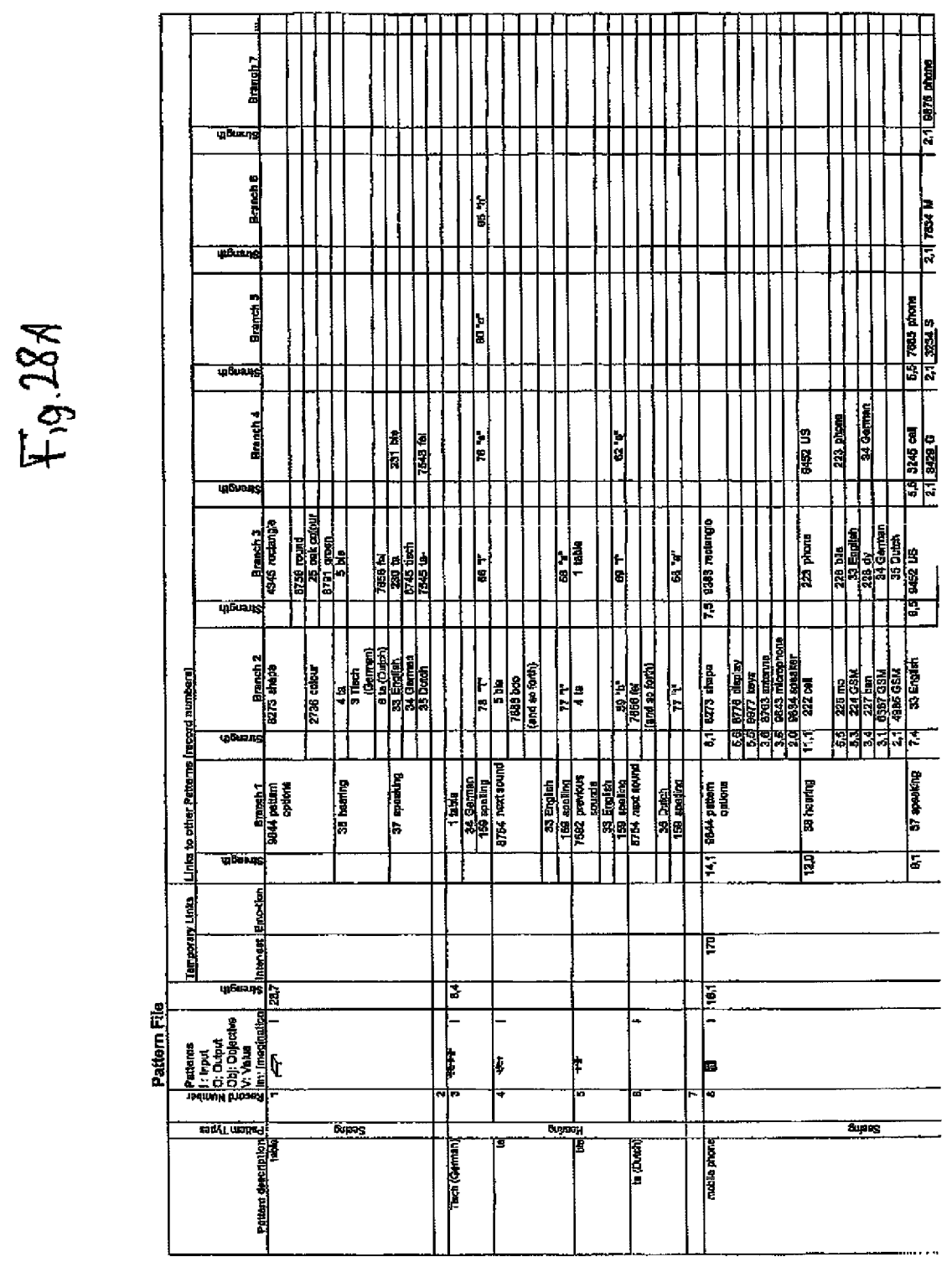
Figure 28B:
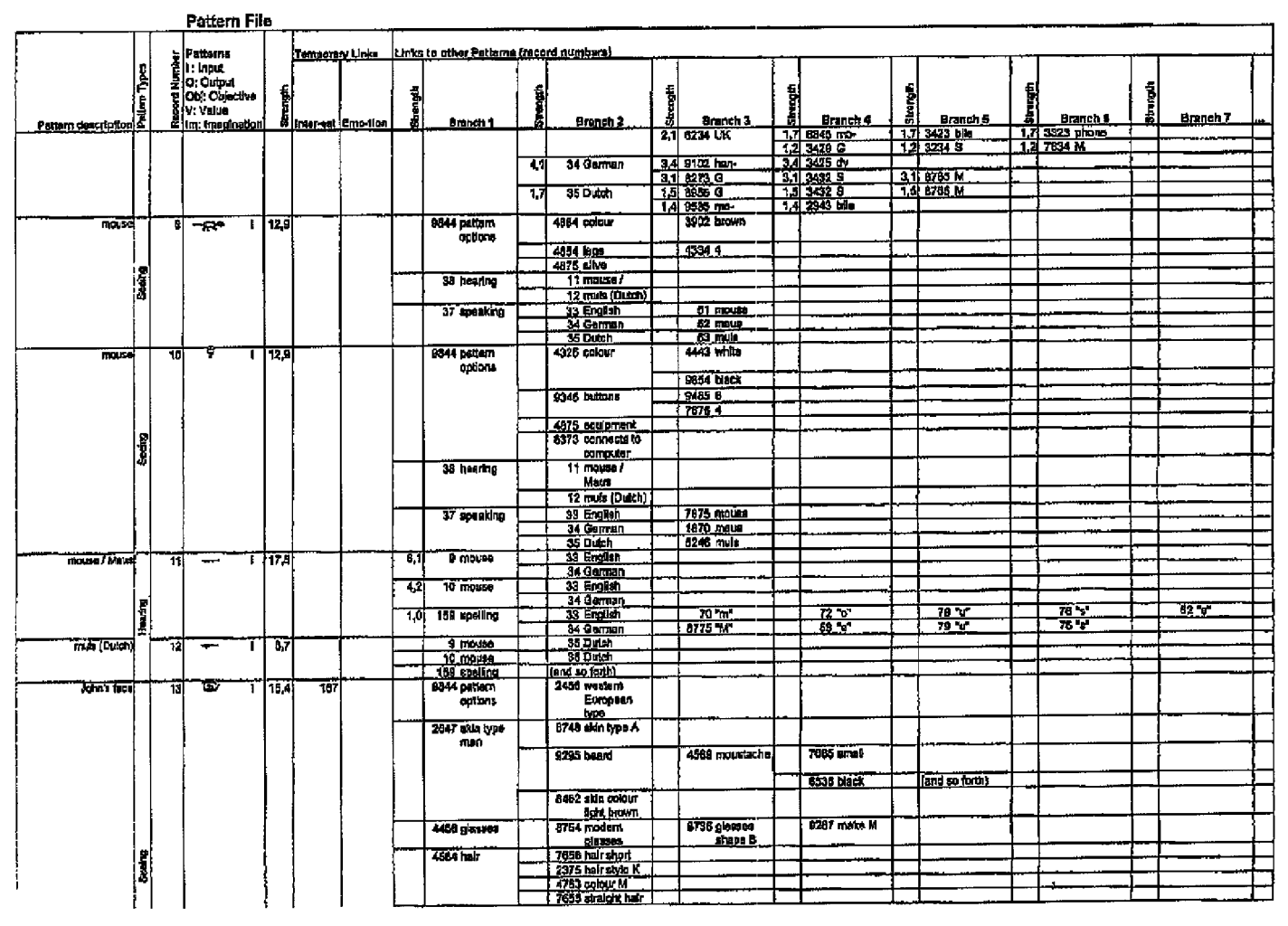
Figure 28C:
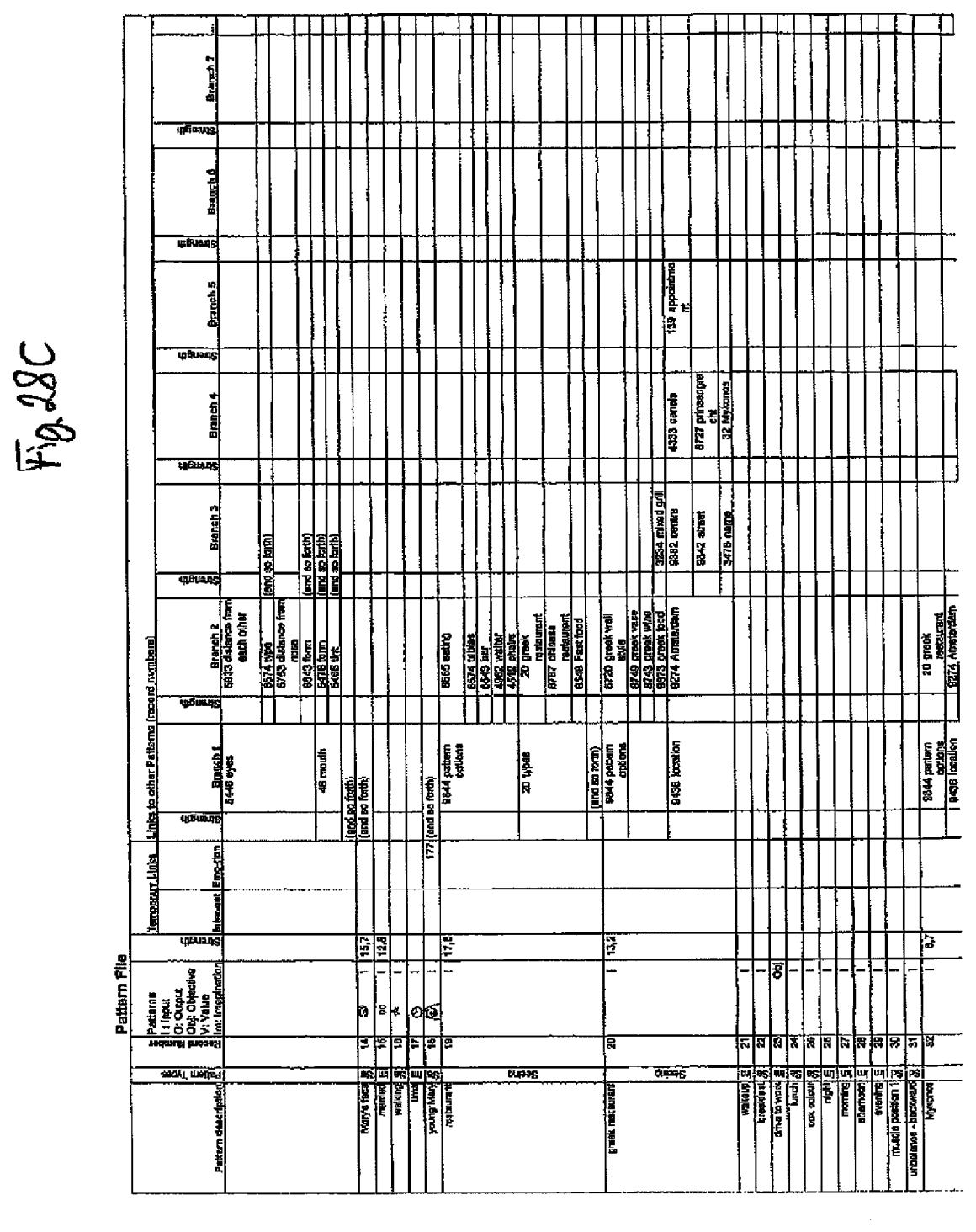
Figure 28D:
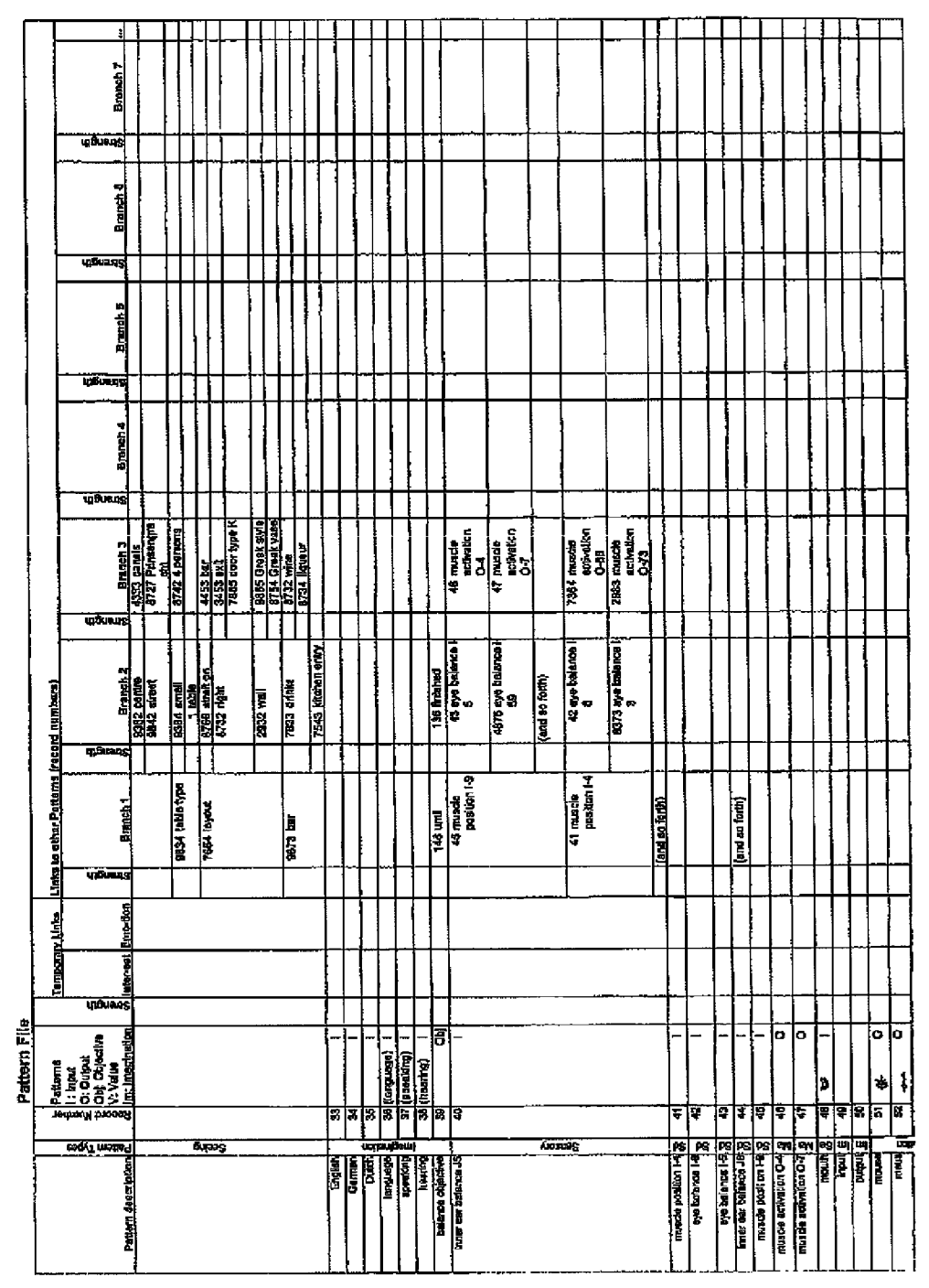
Figure 28E:
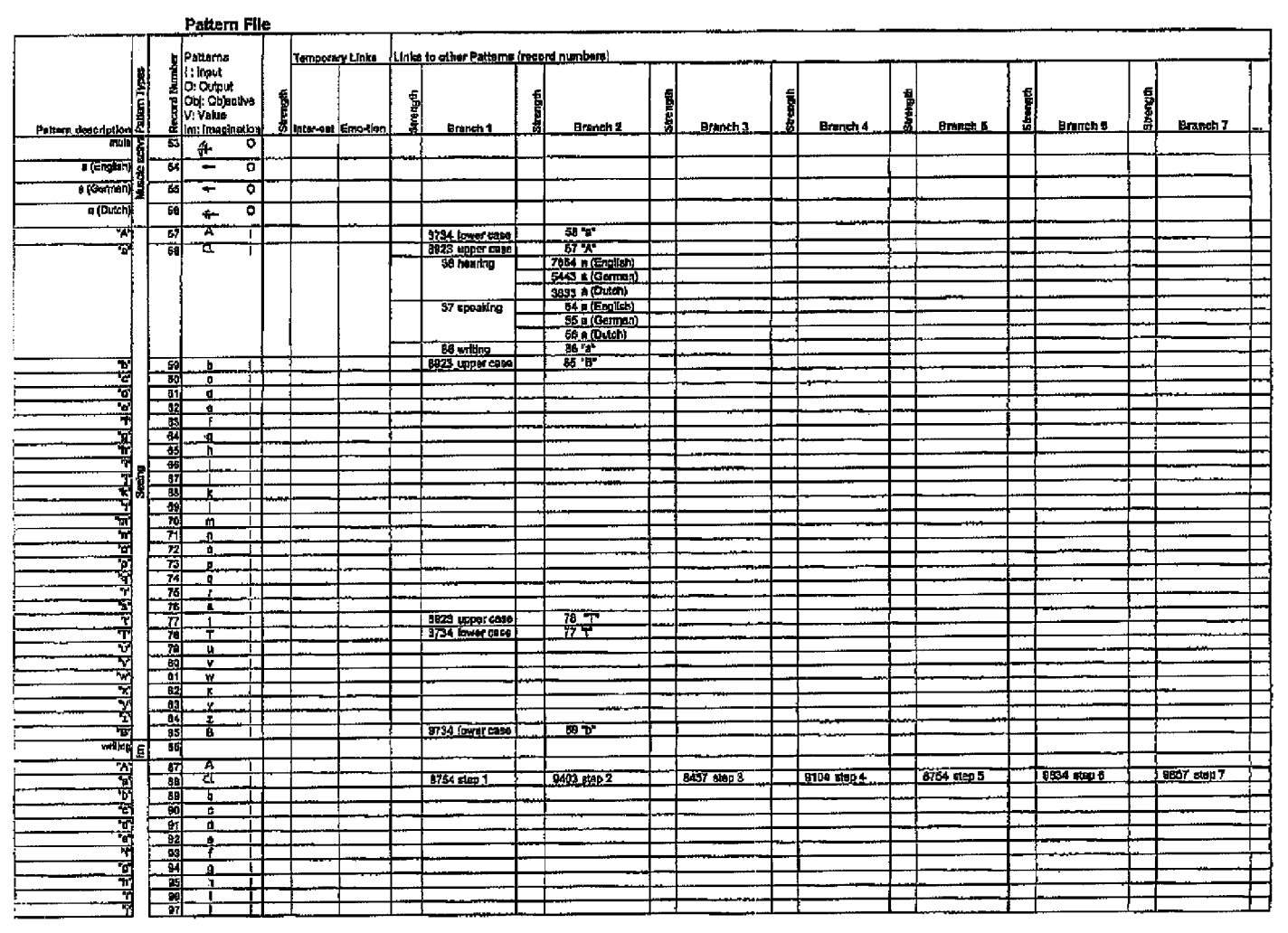
Figure 28F:
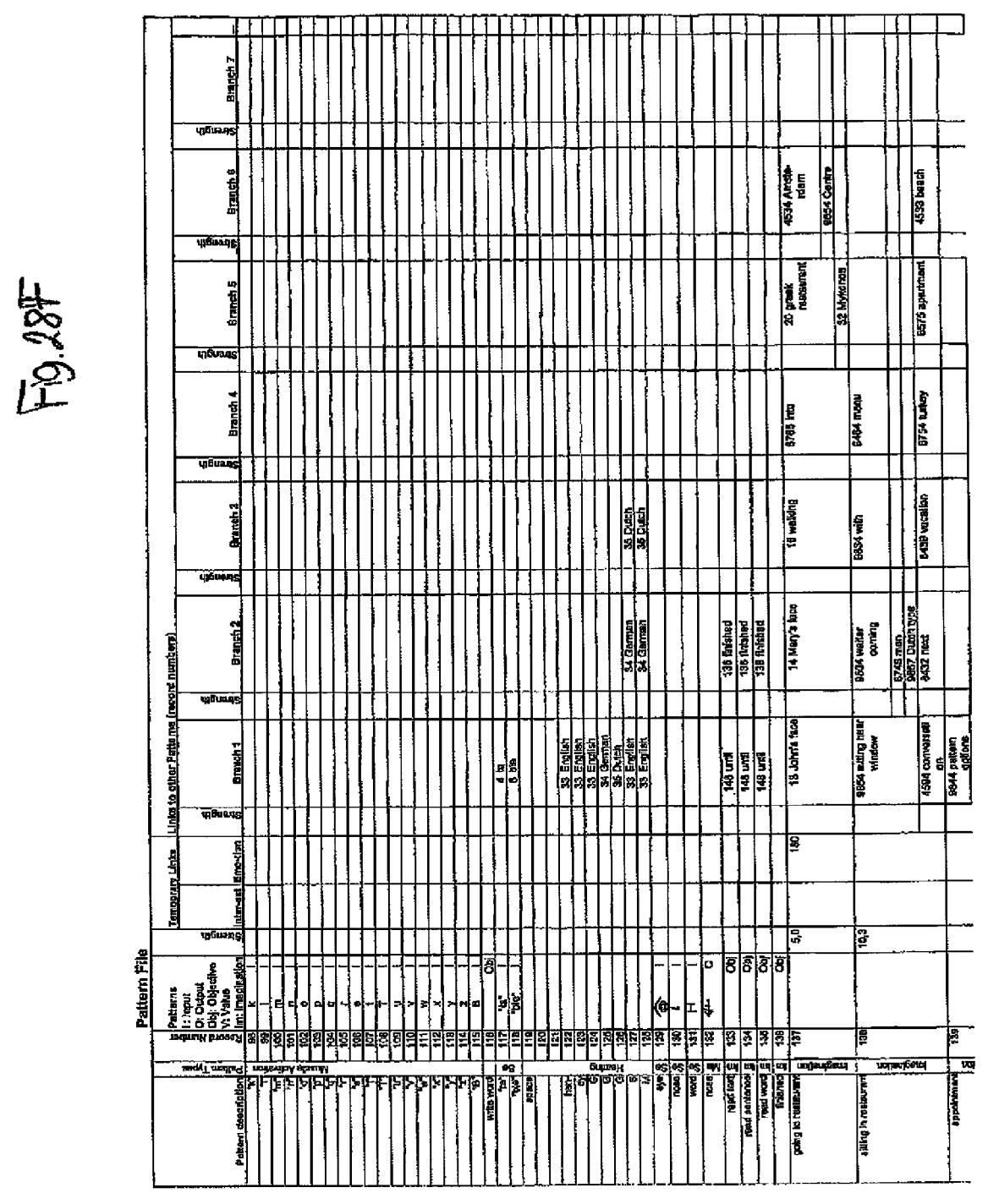
Figure 28G:
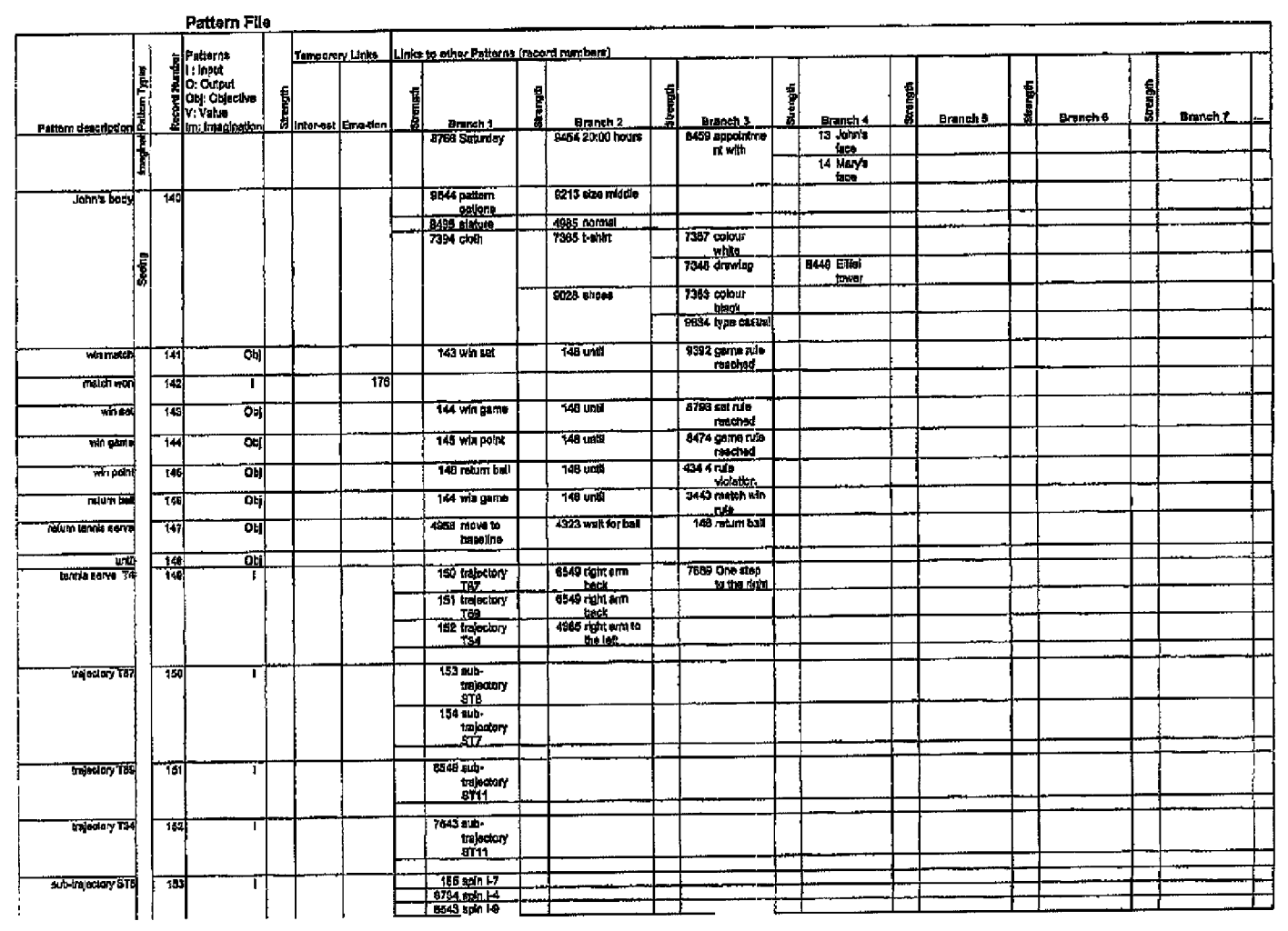
Figure 28H:
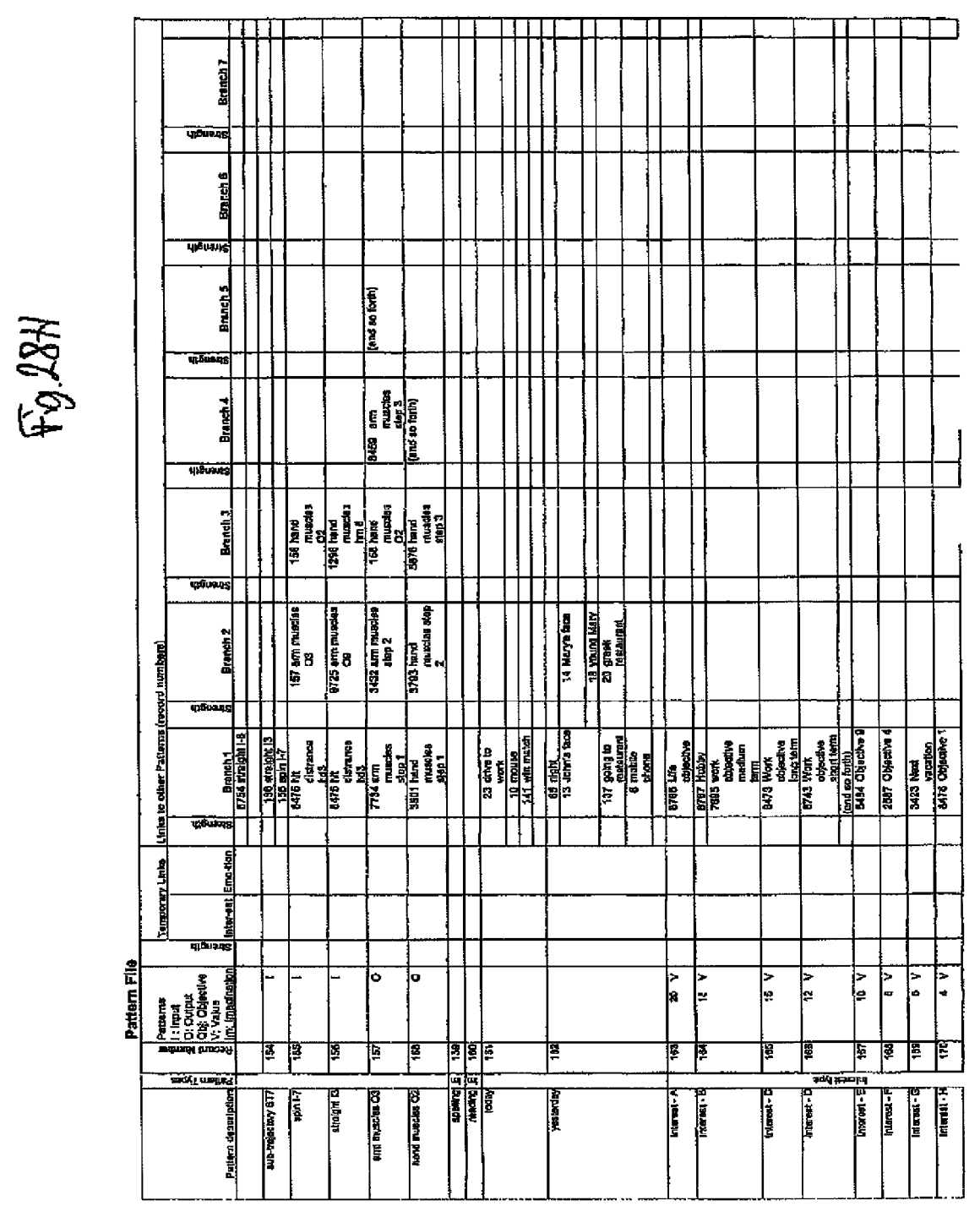
Figure 28K:
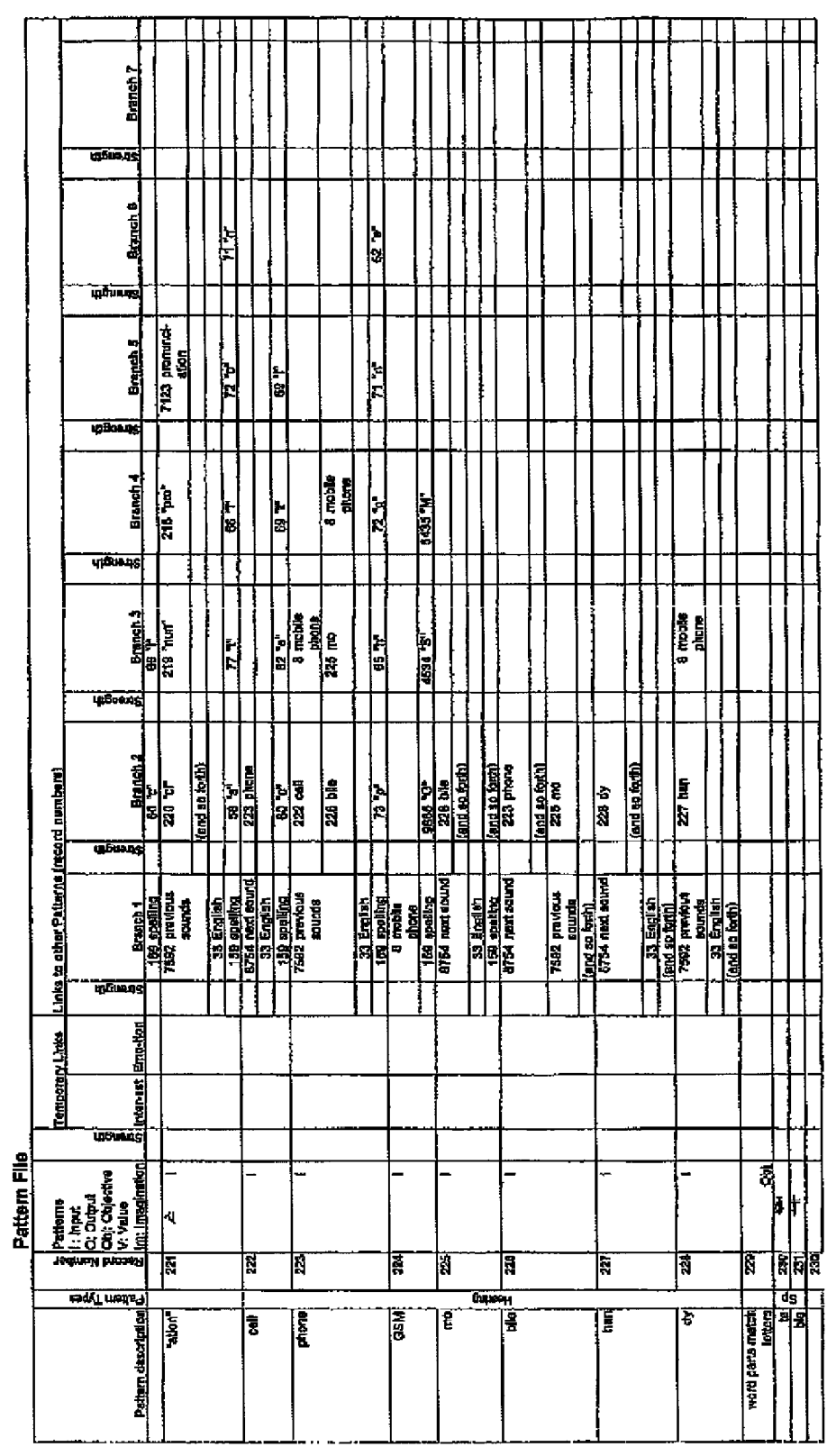

FIG. 28A to FIG. 28K show parts of a file including information processed by a neural network according to an exemplary embodiment of the invention.

DETAILED DESCRIPTION

Figure 1:
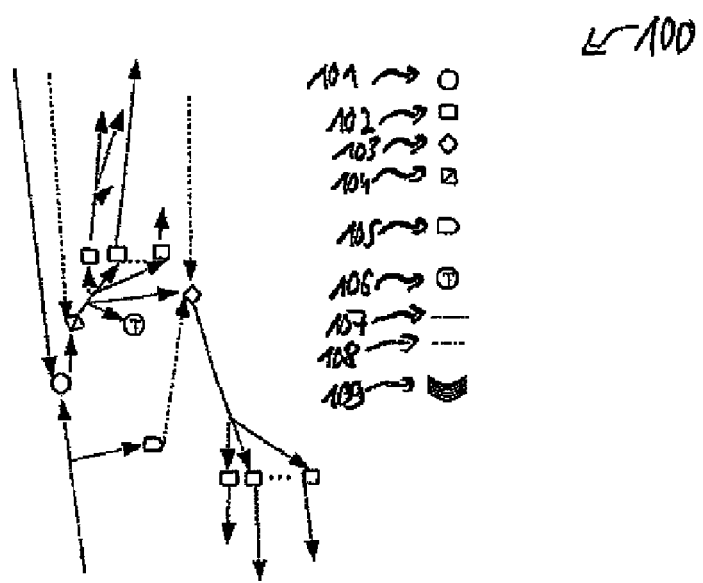
FIG. 1 shows a part of a main building block of a neural network according to an exemplary embodiment of the invention.

The illustration in the drawing is schematically. In different drawings, similar or identical elements are provided with the same reference signs.

An advantageous aspect of the invention is that patterns may be created from objects. For example, tiny points, representing the lowest level of visual objects are associated with each other to form lines and other lower-level objects. Instead of maintaining, for example, the complete data a visual object is made up of, patterns (only) contain information that identifies the object. At the lowest level, a pattern recognition mechanism identifies the lowest level patterns. Then, the low-level patterns are readily available.

Figure 2:
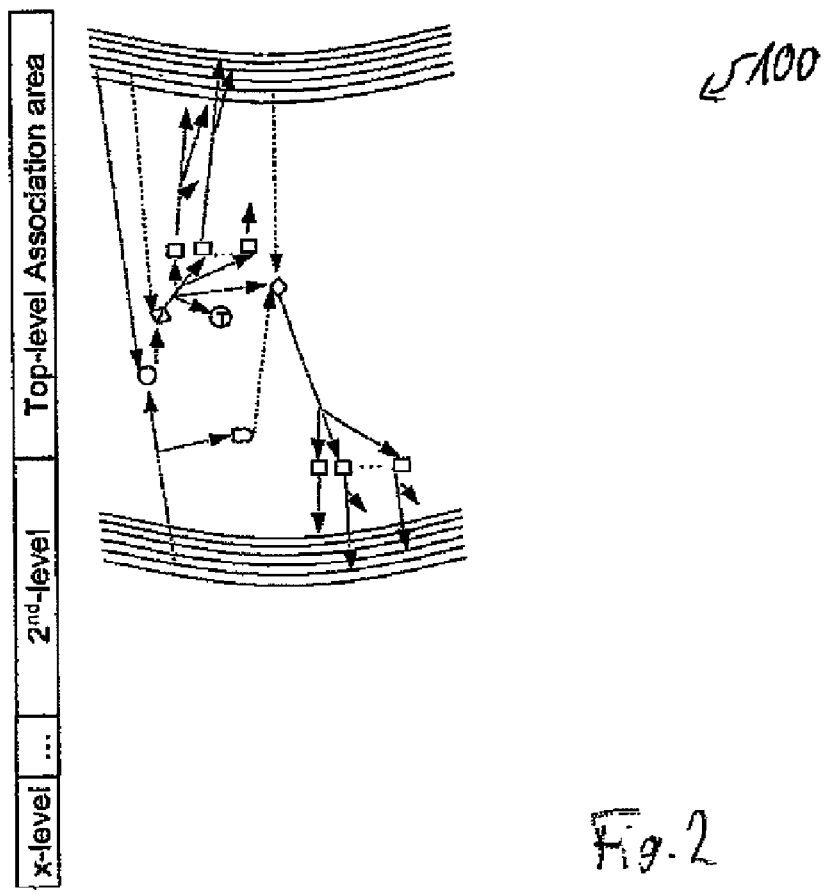
FIG. 2 shows another part of the main building block of the neural network according to the exemplary embodiment of the invention shown in FIG. 1.

FIG. 1 and FIG. 2 illustrate main building blocks according to an exemplary embodiment of the invention.

In the following, referring to FIG. 1 and FIG. 2, a neural network 100 according to an exemplary embodiment of the invention will be described.

The neural network 100 comprises a plurality of neurons 101 to 106. These neurons include pattern name neurons 101, tree neurons 102, bridge neurons 103 (disabled by default), inhibition neurons 104 (signal goes through by default), frequency neurons 105 (send "open" signal), T-neurons 106 (path to central place for decision making). T-neurons 106 may be dispensible at lower levels and for fully automated tasks.

As can be taken from FIG. 2, a plurality of wires, namely a bunch of wires 109, is provided which is adapted for connecting the plurality of neurons 101 to 106. The bunch of wires 109 (providing connectivity) comprise wires having a plurality of input connections and exactly one output connection, or having exactly one input connection and a plurality of output connections.

Furthermore, first connections 107 and second connections 108 are provided to connect different neurons 101 to 106 to one another. The first connections 107 describe a path which is available, but no signal. The second connections 108 illustrate a frequency path.

FIG. 1 only illustrates a part of a neural network 100. An extended illustration of the neural network 100 is shown in FIG. 2. As can be seen in FIG. 2, the neural network 100 comprises a plurality of levels, wherein an x-level, . . . , a second level, and a top level association area are shown exemplary. The same structure as shown for the top level association area can be repeated in the second level, . . . and in the x-level.

The neurons 101 to 106 of one level (for instance of the top level in FIG. 2) are grouped to corresponding groups, wherein this group of neurons is arranged to define a hierarchic structure. In other words, the different levels in FIG. 2 relate to different hierarchic levels of the neural network.

As can be taken from FIG. 2, the neurons 101 to 107 of the corresponding group, namely the top level, are connected between two adjacent bunches of wires 109.

Additionally, the neurons 101 to 106 are interconnected to one another by the connections 107, 108. A strength value is associated for one, some or each connection 107 to 109 between different neurons 101 to 106, wherein the strength value of a particular connection is indicative of a probability that information input to the neurons 101 to 106 propagates via the particular connection 107 to 109. More precisely, a strength is only needed for the touch points with 109, it could be used between 104 and 102; and could be used between 103 and 102. The strength value may be modified continuously by a strength adjustment unit (not shown) based on criteria like the information traffic per time between two neurons via the respective connection 107 to 109. The strength value of each connection 107 to 109 may be decreased when no signal propagates along such a path for more than a predetermined time interval. When a signal has to be sent from one neuron to another one, the path with the highest strength value may be selected for this transmission.

When one path 107 to 109 turns out to be particularly important, since this path is used for conveying signals quite frequently, then the strength value of this path will not be reduced even after traffic-less expiry of a time interval, but will be maintained constantly at least at a predetermined value. However, it might be possible that the predetermined value may be exceeded when this path turns out to be used quite frequently also in the future.

When a path is no longer needed since it has not been used for a long time, then this particular connection may be interrupted forever or for a time period.

As can be taken from FIG. 1 and FIG. 2, the arrangement of the neurons 101 to 106 and the coupling by means of the connections 107 to 109 ensures that even a large amount of information may be processed in parallel.

The neurons 101 to 106 comprise incoming interfaces to receive a signal fired by another neuron 101 to 106 and can comprise one or more outgoing interfaces to send or fire a signal to another neuron 101 to 106.

The different neurons 101 to 106 relate to different kinds of neurons, as will be described below.

A main building block according to an exemplary embodiment of the invention is illustrated in FIG. 1, and shows structures that relate to a single pattern.

By such a structure, a single pattern is identified from other patterns. Other connections 106 to 109 and other neurons 101 to 106 provide functionality to connect, for example, with other patterns.

A second building block, added to the one in FIG. 1 and illustrated through FIG. 2, provides the wires 109 that allow the structure of the individual pattern to connect with other patterns.

This is illustrated through the bunch of wires 109 above and another bunch of wires 109 below. The connectivity may be established in a vertical way whereby, for example, lower-level patterns lead to higher-level patterns, in a horizontal way or a combination thereof. Together, the system may act as a switching mechanism. As new patterns come in or patterns need to be connected with each other, connections may be made through the individual wires 109 within the bunch of wires 109.

Depending on a strength factor and available capacity, the connections may last for, for instance, parts of a second (or less) to years (or longer, essentially "forever"). Freed connections may be re-used for new patterns and new associations.

Following is an overview, listing functionality of elements of this structure:

A neuron 101 to 106 Neurons of the human brain have been used as template or model for what is referenced as "neuron" with exemplary embodiments of the invention. However, neurons according to exemplary embodiments of the invention may and will have functionality that differs from the neurons of the human brain.

A neuron, in the context of exemplary embodiments of the invention, may be particularly able to fire impulses and/or to establish circuits with other neurons. A neuron may have an outgoing wire, which can split into many wires. They may connect with other neurons or within the bunch of wires above or below. A neuron may accept one or more incoming connections. Those connections may or may not be active.

Tree neurons 102 A single tree neuron 102 can have many connections into the bunch of wires 109. However, only one connection can be active at any time.

Multiple tree neurons 102 can be active in parallel and may establish multiple circuits with the name pattern they represent.

Increased "firing" or an "extent"-frequency may drive tree neurons 102 to activate or find more circuits for the pattern Bridge neuron 103 The bridge neuron 103, disabled by default, may provide connectivity to the association area below; an "open"-frequency may enable it and may make it fire to activate the circuit it is part of.

Inhibition neuron 104 The inhibition neuron 104 may be enabled by default; a "no"—frequency disables it Frequency neuron 105 As the frequency neuron 105 detects activity at its incoming wire, it sends an "open"-frequency (T): "T"—neuron 106 The (T) neuron 106 may connect to a central place for the purpose to identifying the pattern that is current "on". This information can be used for decision making It may be only active for very brief moments of time. One possible implementation is that the central place handles only one active (T) neuron 106 at a time, which can be the one of the highest strength or focus at the moment.

As automation of a circuit takes place (i.e. a high strength), these neurons 106 can loose their ability to connect to the central place.

Path types There may be particularly two types of paths:
"Normal" paths: They are for normal activity and to establish circuits. They can carry signals such as the "no"-frequency Frequency paths: They are specific for the transfer of signals "Bunch of Wires" 109 There can be many incoming connections to individual wires 109 within the bunch of wires 109.

An individual wire 109 from within the bunch of wires 109 can have only one outgoing connection. It can only connect to one pattern. This may be established through one normal path and one or more frequency paths.

The bunch of wires 109 may allow for connectivity of all top-level patterns with each other. At the lower-level association areas, this connectivity may or may not be limited to an area, for example, the area of visual information. Further sub-sections are possible as well. Though, it may or may not be needed that the wires 109 span over the whole area.

Circuits Through circuits, meaning between two or more patterns may be established.

There can be multiple active circuits from a single pattern.

A circuit can be established through passing through multiple patterns

Activation of an existing circuit The initial firing of multiple tree neurons 102 (within a single pattern structure) may be such that, by default, only one previously established connection gets activated.

Connections to other patterns that are active but do not fire to the circuit can be a proper choice.

Subsequent circuits may be activated as other patterns, having circuits to this pattern, fire as well.

High strength (i.e. automation) can automatically activate multiple neurons 101 to 106.

Certain frequencies may activate circuits.

"No"-frequency Disables a circuit

"Open"-frequency Opens a blocked circuit.

"Extent"-frequency Causes up-ward facing tree neurons 102 to activate frequency more available but inactive circuits.

May optionally cause down-ward facing tree neurons 102 to activate more available but inactive circuits Strength The strength may be established where the neurons 101 to 106 connect within the bunch of wires 109.

When a single tree neuron 102 has multiple established connections within the bunch of wires 109 and it fires, the connection with the highest strength (=least resistance) may be opened.

The strength of a connection is increased through each re-activation of the circuit or through special impulses, which can be based on value patterns.

The strength of the connections is automatically reduced to free up the least relevant connections.

Above a certain level of strength, the strength becomes permanent and is not reduced anymore. This level of strength may differ in different areas and level.

Sequence The order in which patterns are activated or positioned in a circuit may establish a sequence.

A pattern A pattern may be or include the information needed to identify an object without storing, for example, the detailed visual information of an object.

Pattern types "Input patterns" may be automatically activated from sensory information such as visual or audio input.

"Output patterns" may activate something. This may, for example, be a movement or the creation of a sound.

"Value patterns" may be, for example, used to establish the strength of connections within circuits.

"Objective patterns" are patterns that, for example, drive do go from place A to place B. They may be involved in decision making. They may hold the decision.

"Imagination patterns" are other patterns, for example, new patterns created from existing patterns As an alternative to the above example for an activation of the circuits, it is possible to generally maintain the architecture but to activate a circuit by a plurality of patterns (sequentially and/or simultaneously).

In the following, an exemplary hierarchy will be explained in which circuits are activated:

If two or more patterns of a previously established association/circuit fire, this takes preference over other criteria and activates the circuit.

If a pattern fires to a pattern that is active for another reason but that pattern does not fire at the moment, this activates the circuit or a part of the circuit.

If neither of the above criteria applies, the firing pattern fires through the path of highest strength. This activates the pattern at the other end of the path.

The "extend" frequency can activate additional paths to multiple patterns.

Subsequent circuits are activated as other patterns with circuits to this pattern also fire.

High strength (=automation) can automatically activate multiple neurons. It can also overrule some of the activation criteria.

To visualize how everything may work when many patterns go on, the example of lightning may be considered. Science has found that lightning involves "leaders," which become visible through high-speed cameras. Prior to the discharge taking place, many leaders face downward from the clouds. From the ground, there are also many upward-facing leaders. Typically, one downward-facing and one upward-facing leader connect. This is the path through which the actual lightning takes place, through which electricity flows.

In the brain, a large number of patterns are constantly going on. This means their name neurons are firing and activate linked patterns. Thinking about the firing as leaders, as two leaders connect, existing associations are activated. If two patterns have a previously established connection, this automatically becomes the preferred connection, because there is a higher strength, which means lower resistance for electricity to flow. If there is no existing association, a new association is created.

If only one of two connected patterns fires, it is like one leader trying to get from the clouds to the ground. Envision that the latter requires more "power" to reach the ground than would be the case if there were also an upward-facing leader. This way, a priority is established: Two connecting leaders become a preferred choice over one leader. Further, imagine there is a great deal of "lightning" taking place within the brain all the time.

This explains why it is not necessary to read words from the left to the right. And it explains why many people can read and understand the meaning of sentences that have the correct words, but the letters in each word are mixed up. For example: "Tsih boko exiapins woh teh haumn bairn mya be precosisng inrfomtaino." At first, the letter combinations do not make sense. But as those combinations are disregarded, the highest-strength combinations of the activated letters surface. Even if, at first, the meaning of a word is incorrect in the wider context, the same technique will disregard that meaning at sentence level, which lets the next option surface.

Figure 3:
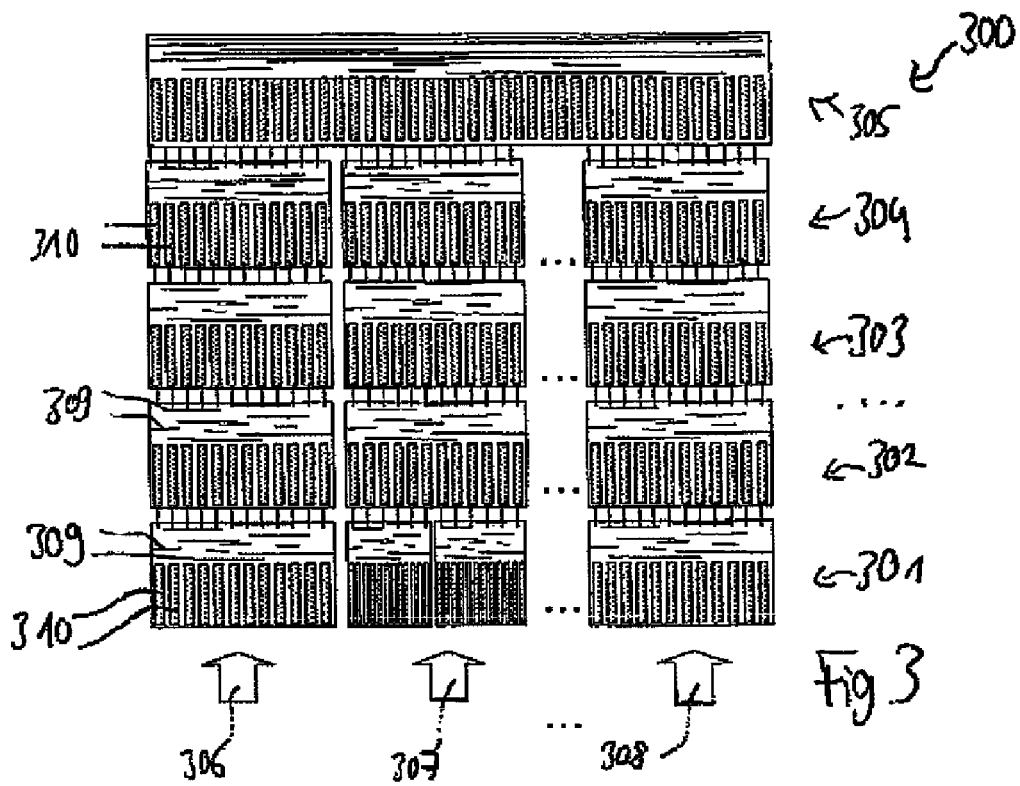
FIG. 3 illustrates a hierarchically constituted neural network according to an exemplary embodiment of the invention.

FIG. 3 illustrates an example on how the building blocks can be brought together in a wider structure.

FIG. 3 illustrates an exemplary embodiment of a hierarchical structure of a neural network according to an exemplary embodiment.

The hierarchical structure 300 includes an x-level 301, an x–1-level 302, . . . , a third level 303, a second level 304 and a top level 305. In each of the levels 301 to 305, corresponding patterns 310 may be stored, processed or identified. Reference numeral 309 illustrates a bunch of wires 109.

As can be seen in FIG. 3, a first block of the x-level 301 is fed with hearing information 306. A second block of the x-level 301 may be fed with visual information 307. A third block of the x-level 301 may be fed with "y-information", for instance olfactory information or other information related or not related to any of human senses.

According to the hierarchical structure of FIG. 3, the x-level 301 identifies pattern in the information 306 to 308. These patterns may be found or processed by means of the neurons 309. This low level pattern information may be provided to the next higher level, in the case of FIG. 3 the x–1-level 302. Thus, the pattern abstraction levels are increased from level to level 301 to 305, wherein at a top level 305 the information may be unified or brought together in order to take a decision based on the processed information.

Thus, FIG. 3 illustrates one of many possible structures into which the building blocks of FIG. 1 and FIG. 2 can be brought together.

Patterns 310 typically connect directly above or below into the bunch of wires 109. The individual wires 109 within the bunch of wire 109 may or may not span the whole area or only a part of the area. All wires 109 within the bunch of wires 109 may or may not provide connectivity options for all patterns 310 with a level 301 to 305 and area. The number of patterns 310 and connectivity options within a level 301 to 305 and area may vary.

The detailed functioning according to exemplary embodiments of the invention will be illustrated through a couple of examples. The record numbers shown within the drawings (FIG. 4 to FIG. 27) correspond to record numbers, which will be discussed later on. As the functionality may relate to things humans conventionally do better than conventional computers, and as embodiments of the invention may improve—by modeling—computers in a way that comes closer to how humans do these things, the examples are related to human behavior. Together with other building blocks, it may be possible to have computers executing the examples similar to a human way.

EXAMPLE 1

Figure 4:
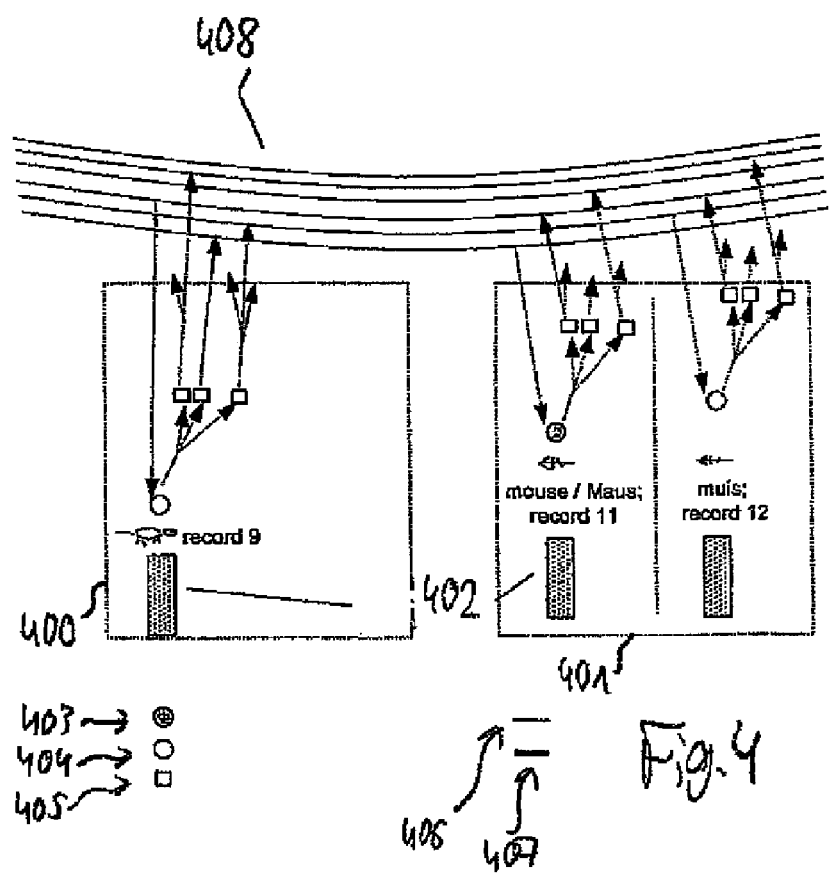
FIG. 4 illustrates a first part of associating a sound pattern with a visual pattern according to an exemplary embodiment of the invention.
Figure 5:
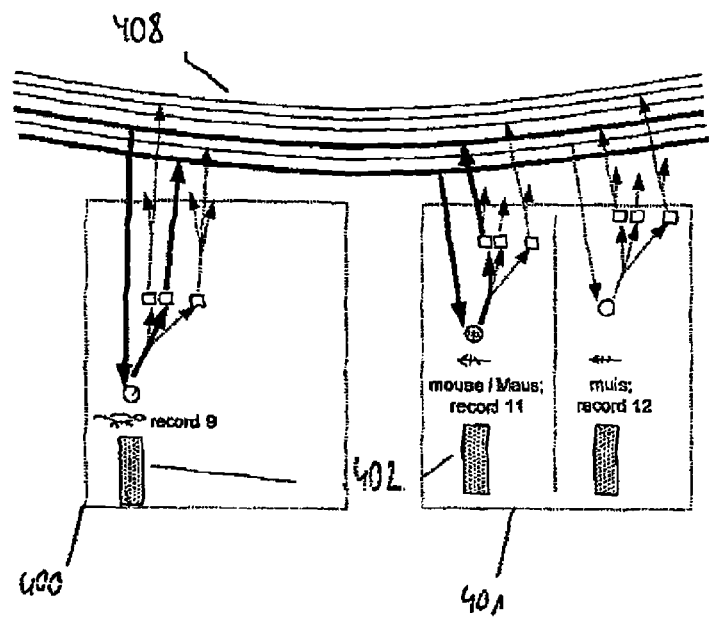
FIG. 5 illustrates a second part of associating a sound pattern with a visual pattern according to an exemplary embodiment of the invention.

FIG. 4 and FIG. 5 illustrate an example how three higher-level patterns can be connected with each other.

Reference numeral 400 denotes a visual area. Reference numeral 401 denotes a hearing area. Reference numeral 402 denotes pattern details. Reference numeral 403 illustrates a pattern name neuron "on". Reference numeral 404 illustrates a pattern name neuron "off". Reference numeral 405 illustrates a tree neuron. Reference numeral 406 illustrates that a path is available, but no signal. Reference numeral 407 illustrates that a circuit is established. Reference numeral 408 illustrates top-level switching.

It is assumed that a person says: "There is a mouse on the table". A moment later a mouse is seen walking over the table. It is further assumed that the object of the sound "mouse" and the visual object of "mouse" have been seen before and associated with each other. As the sound for "mouse" is heard, the system automatically activates the sound pattern for "mouse" (see FIG. 4). The name pattern fires, which make the tree neurons 405 fire.

Next, the path of least resistance or highest strength value is chosen and leads to the visual pattern of the "mouse" object (see FIG. 5). As the path back to the hearing pattern is available from previous activations, the circuit is closed. Meaning is established. The visual object of a "mouse" is expected. As this object is seen a moment later, the visual pattern of the mouse is activated bottom up as well, which acts as confirmation. If the German sound for mouse, "Maus" were to be heard, it would have activated exactly the same pattern because the sound pattern is the same. If the Dutch word "muis" would have been heard, it would have activated a different pattern but would lead to the same pattern that represents the visual object of "mouse". It is the "multiple incoming connections" to a wire 109 within the bunch of wires 109 but "one outgoing connection" to only one pattern that makes this possible.

EXAMPLE 2

FIG. 6 to FIG. 11 illustrate through an example how a new pattern is learned and connected with other patterns.

Reference numeral 600 denotes a bridge neuron (disabled by default). Reference numeral 601 denotes an inhibition neuron (signal goes through by default). Reference numeral 602 denotes a frequency neuron (sends "open"). Reference numeral 603 illustrates a path to a central place (decision making). Reference numeral 604 illustrates that a path is available, but no signal. Reference numeral 605 illustrates that a signal is fired. Reference numeral 606 illustrates that a circuit is established. Reference numeral 607 illustrates a frequency path. Reference numeral 608 illustrates a frequency active path.

In this example, a computer mouse is seen for the first time ever. Very soon thereafter, a person says again "There is a mouse on the table". Through the hierarchy illustrated in FIG. 6, lower-level patterns are identified. They lead to the identification and automatic activation of the higher-level patterns "colour", "button" and "equipment" (see FIG. 6).

Figure 7:
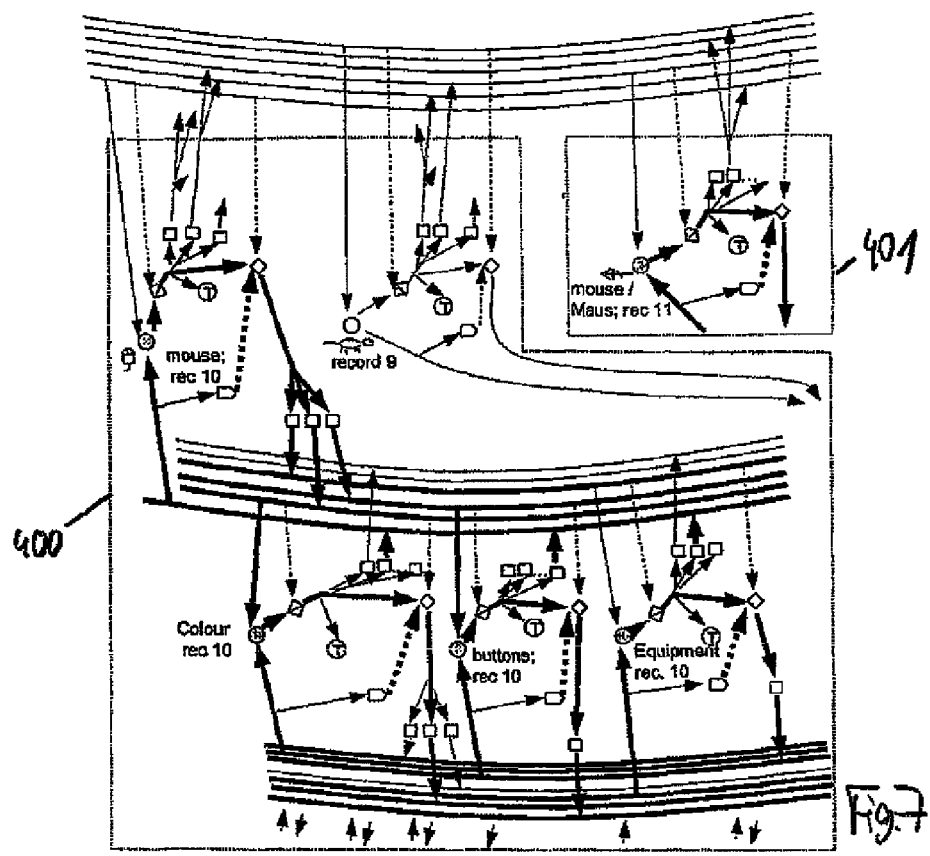
FIG. 7 illustrates a second part of "learning" a computer mouse according to an exemplary embodiment of the invention.
Figure 8:
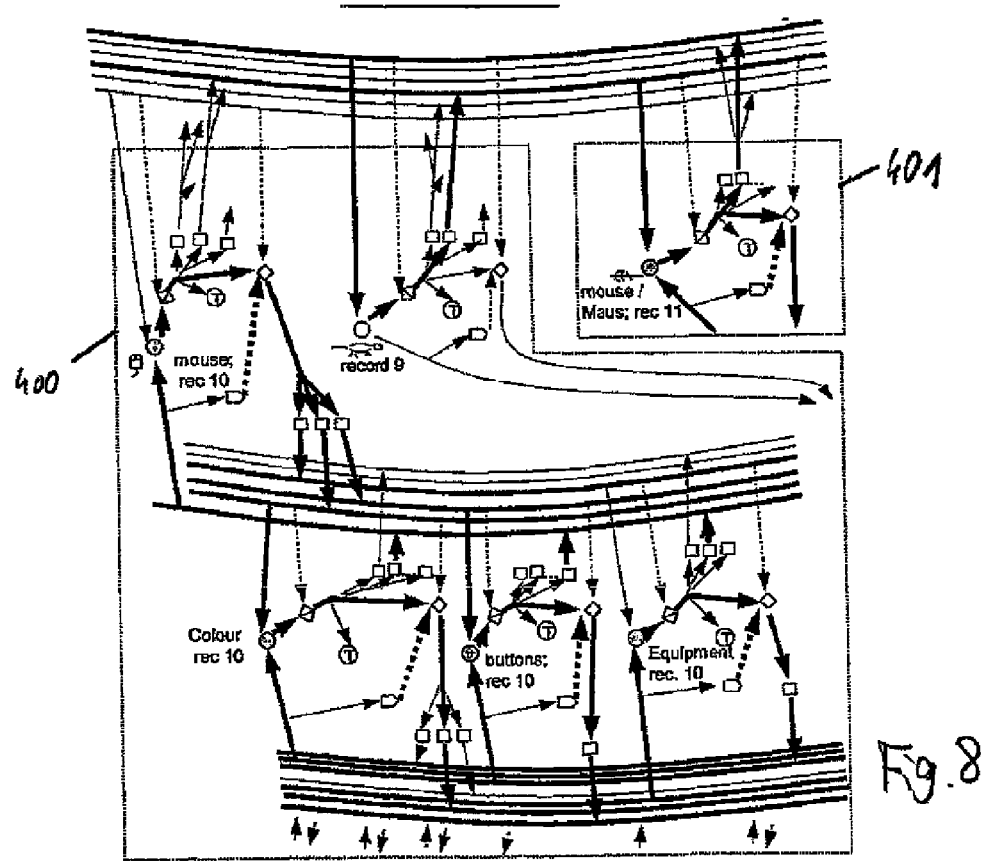
FIG. 8 illustrates a third part of "learning" a computer mouse according to an exemplary embodiment of the invention.

As the word "mouse" is heard, this automatically activates the audio or hearing pattern of "mouse" (see FIG. 7). This works the same as is shown for the visual pattern. In parallel, the visual objects of "colour", "buttons" and "equipment" find an unused pattern structure above and are able to establish circuits (in a real implementation more patterns may be needed). This establishes the new visual pattern of a computer mouse.

The audio pattern of "mouse" has, however, a connection to the visual pattern of the living object of "mouse". As circuits are activated bottom-up, the "mouse" name neuron fires and finds, through the path of least resistance, the old connection to the living animal "mouse" (see FIG. 8). At this point, somewhere else, objective patterns go on and through the central place, a decision is taken: "Insufficient information". More detailed information about the object of a living mouse is needed. Because of the (T) connection to the central place and through the single wire within the bunch of wires connecting through the pattern of the living mouse, a circuit to the central place is available as well.

Figure 9:
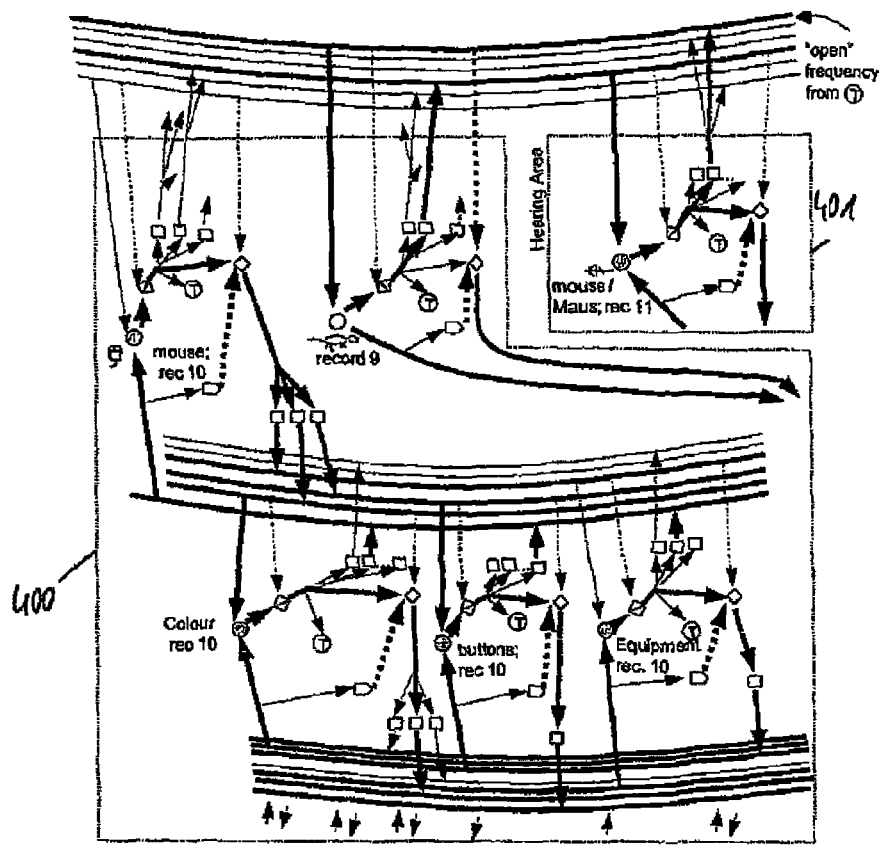
FIG. 9 illustrates a forth part of "learning" a computer mouse according to an exemplary embodiment of the invention.
Figure 10:
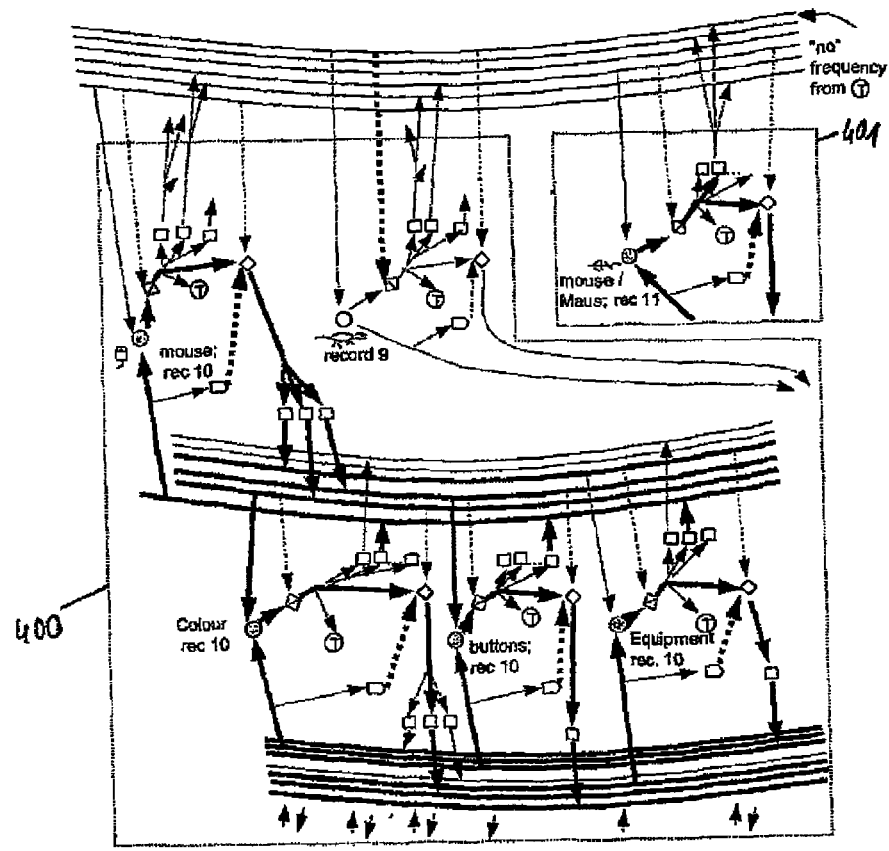
FIG. 10 illustrates a fifth part of "learning" a computer mouse according to an exemplary embodiment of the invention.
Figure 11:
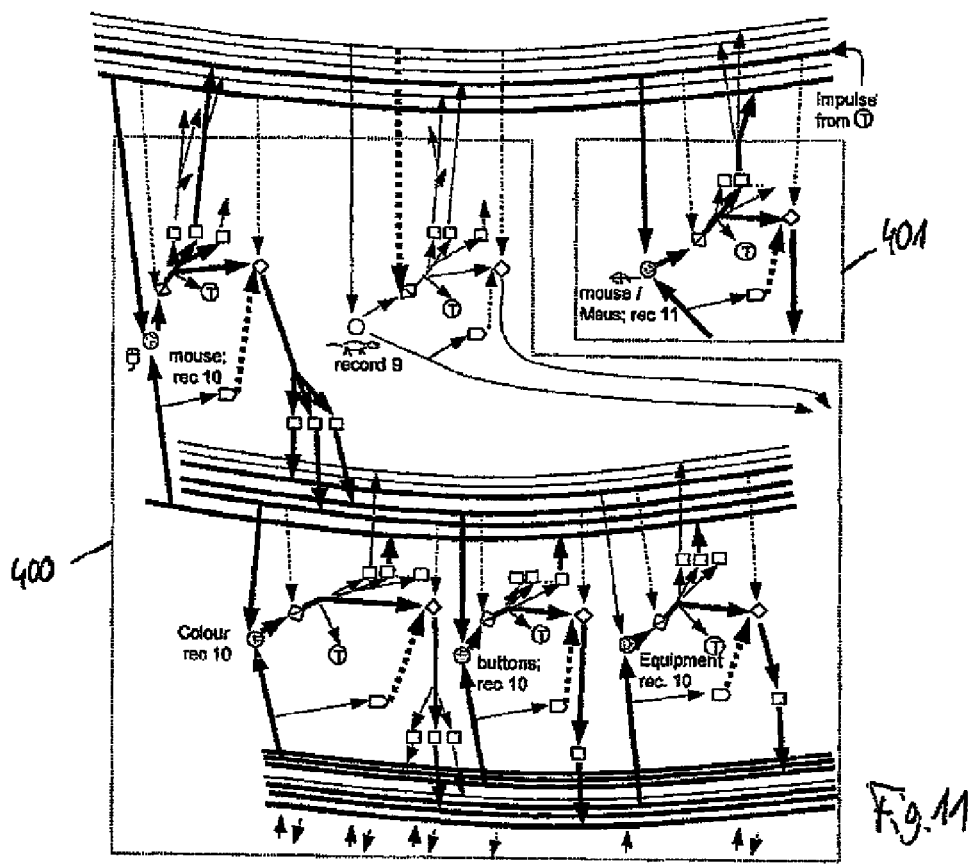
FIG. 11 illustrates a sixth part of "learning" a computer mouse according to an exemplary embodiment of the invention.
Figure 12:
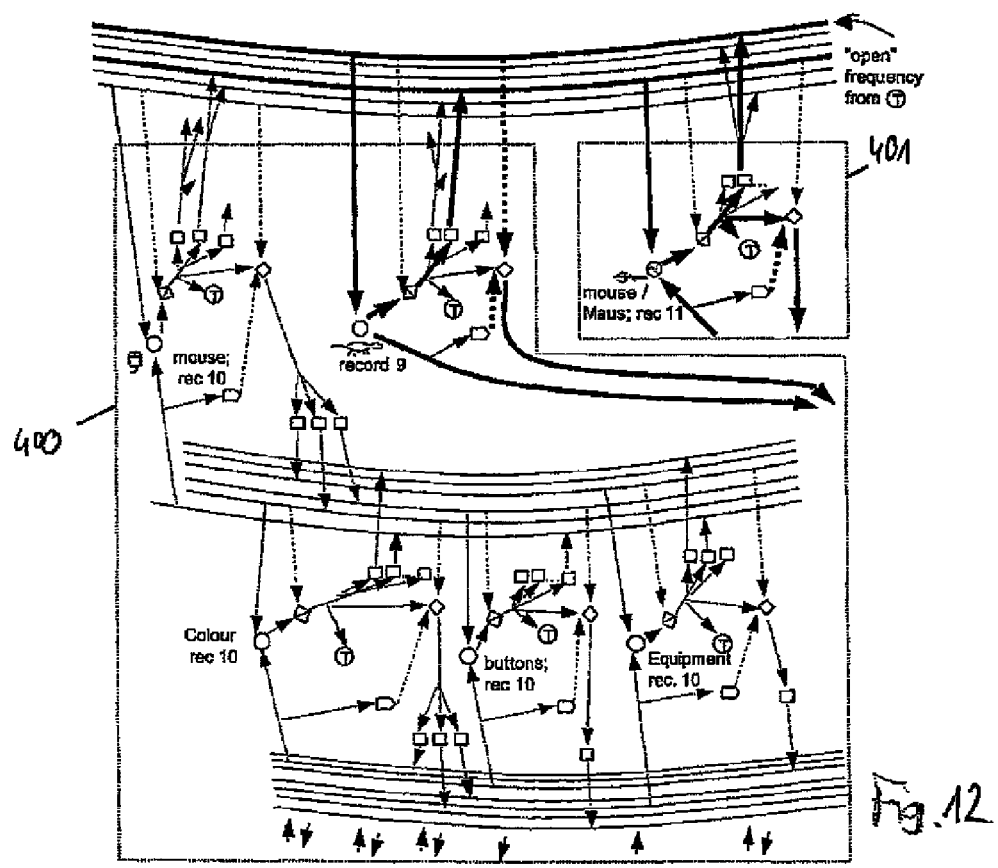
FIG. 12 illustrates a first part of remembering a computer mouse according to an exemplary embodiment of the invention.
Figure 13:
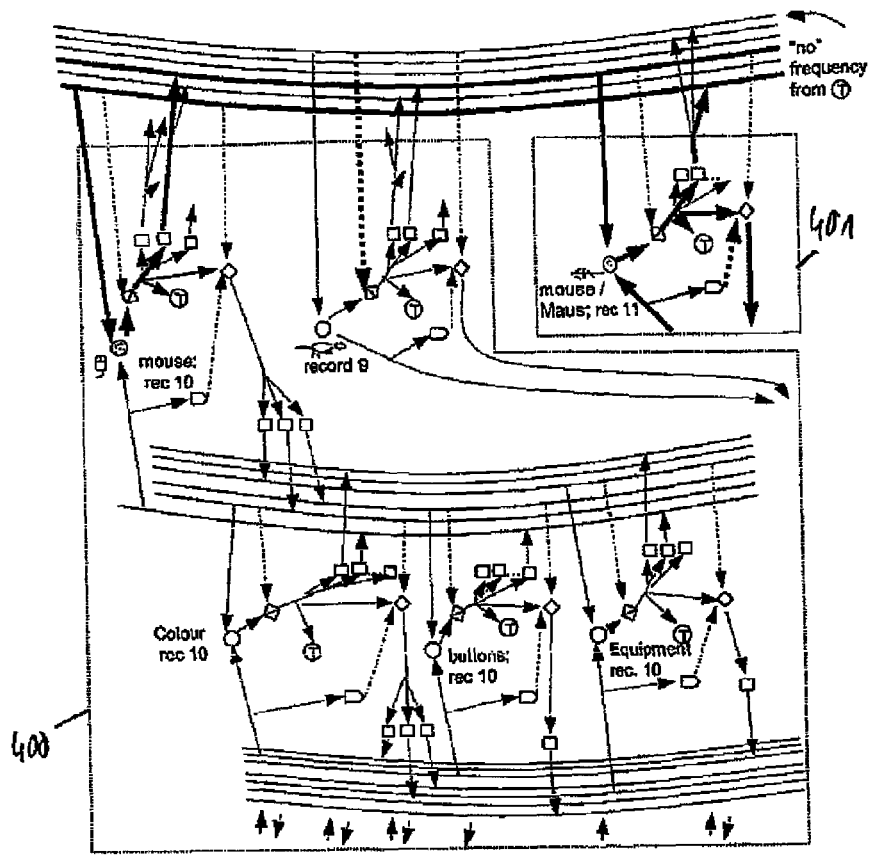
FIG. 13 illustrates a second part of remembering a computer mouse according to an exemplary embodiment of the invention.

An objective pattern like "need more information about the pattern" now sends an "open"—frequency through the circuit (see FIG. 9). This activates the circuits to the patterns that make up the living animal.

At this point and through other objective patterns a decision is made: The sound object and the visual object do not match. This causes a "no"-frequency to be sent from an objective pattern to the pattern of the living animal (see FIG. 10). Again, the circuit through the (T) connection identifies the circuit to which this frequency is sent. This causes all circuits of the living animal to be inactivated.

Next, the sound pattern fires again, for example, because it is reactivated or an objective pattern sends an "extend"-frequency. As the sound pattern and the visual patterns fire about the same time, they find a new circuit (see FIG. 11). Meaning is established. This connection is, however, weak and would fade away through automatic strength reduction. In order to a avoid this from happening, an objective pattern, in conjunction with a value pattern, sends an impulse through the circuit. This impulse establishes additional strength.

EXAMPLE 3

FIG. 12 to FIG. 15 illustrate an example how patterns are remembered.

Figure 6:
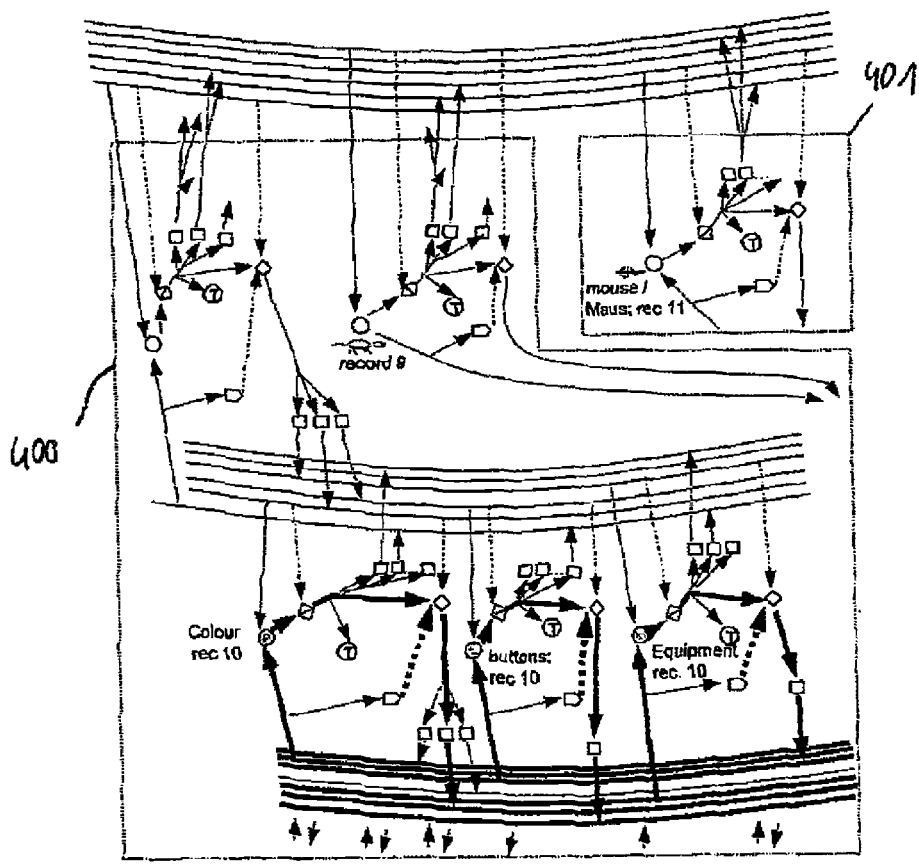
FIG. 6 illustrates a first part of "learning" a computer mouse according to an exemplary embodiment of the invention.

With regard to the symbols used in FIG. 12 to FIG. 15, reference is made to FIG. 6.

It is assumed a few days after the previous example 2 happened, somebody uses the word "mouse". Now, the visual object of "mouse" needs to be recalled from the sound object of "mouse". Just like in the previous example, when the audio object of "mouse" is heard, the hearing pattern is activated bottom up and fires (see FIG. 12). Because the connection to the living mouse has a higher strength, the circuit through the pattern of the living mouse is activated. Again, an objective pattern asks "Is this the right object?". As the conclusion is "no", the "no" frequency is sent. The circuit is broken (see FIG. 13).

Figure 14:
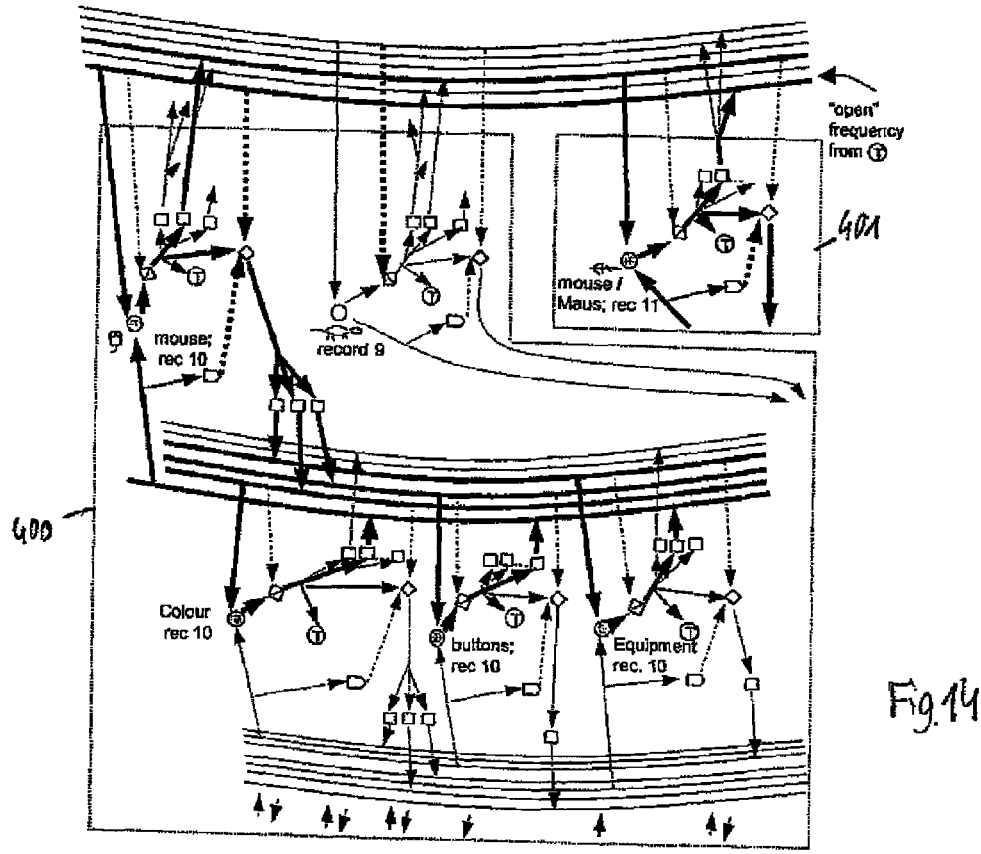
FIG. 14 illustrates a third part of remembering a computer mouse according to an exemplary embodiment of the invention.
Figure 15:
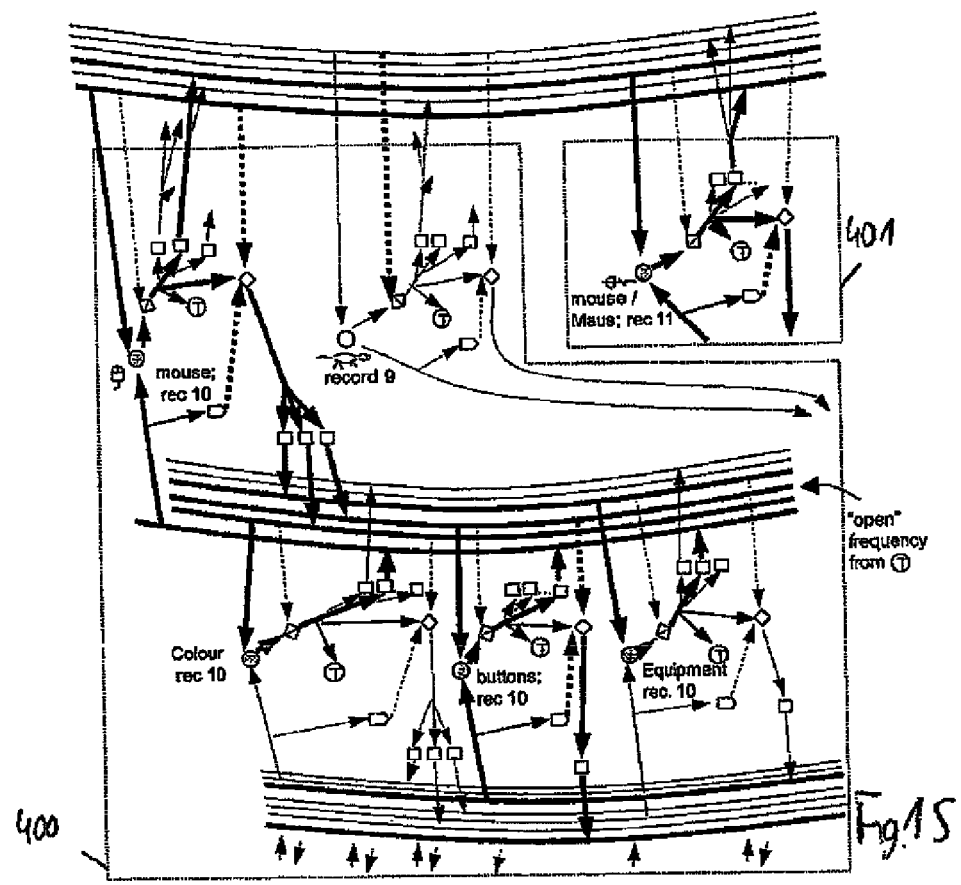
FIG. 15 illustrates a forth part of remembering a computer mouse according to an exemplary embodiment of the invention.

With the connection of the highest strength broken, the next connection opens. It links to the computer mouse. In order to think up how a mouse looks like, the "open" frequency is sent and the $2^{nd}$ level patterns become available (FIG. 14). If the more details to the buttons need to be remembered, another "open"-frequency is sent to the "button" pattern and additional information comes available (FIG. 15).

EXAMPLE 4

FIG. 16 to FIG. 20 illustrate through an example how reading can be done.

With regard to the symbols used in FIG. 16 to FIG. 20, reference is made to FIG. 6.

Figure 16:
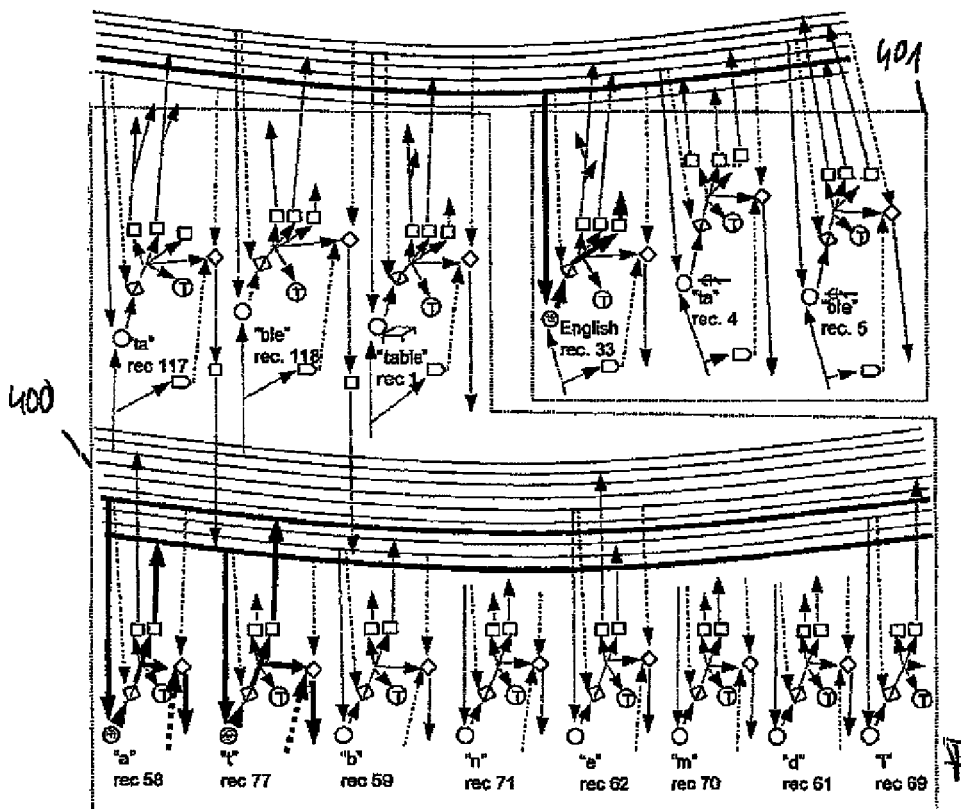
FIG. 16 illustrates a first part of reading a "table" according to an exemplary embodiment of the invention.

This example shows how the word "table" is identified and meaning established. Through other text or audio patterns, it is most likely that a pattern, identifying the language as English, is on. Reading takes place from the left to the right. This is illustrated in FIG. 16. First, the "t" pattern is identified; next is the "a" pattern. Hence, they go on in quick succession.

Figure 17:
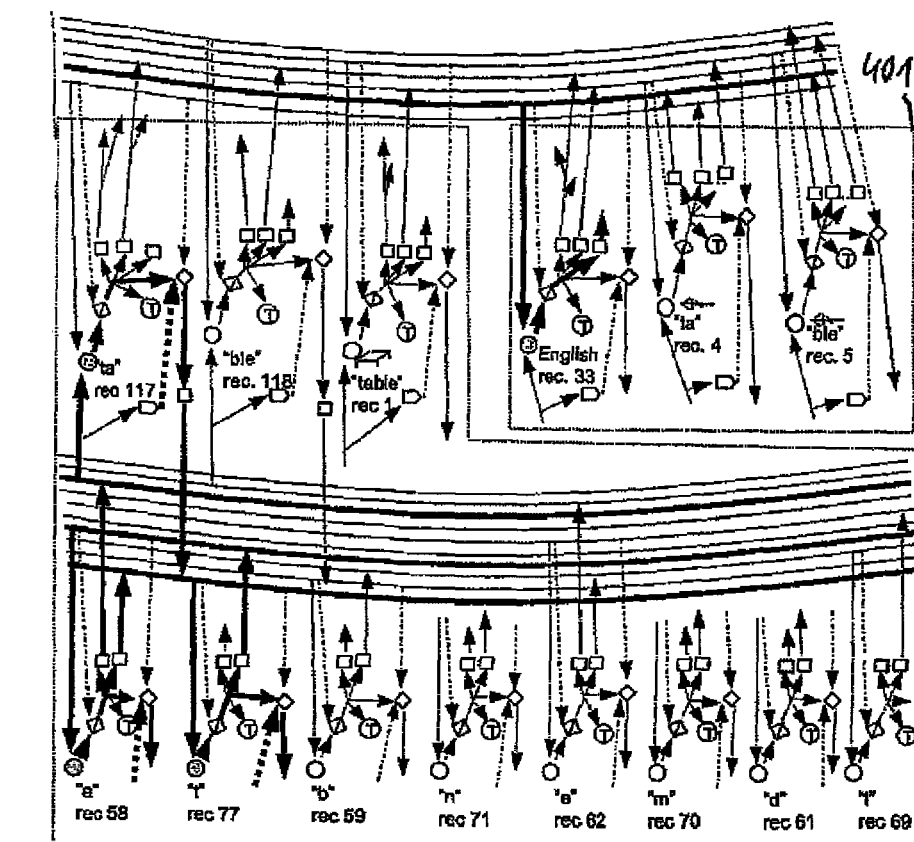
FIG. 17 illustrates a second part of reading a "table" according to an exemplary embodiment of the invention.
Figure 18:
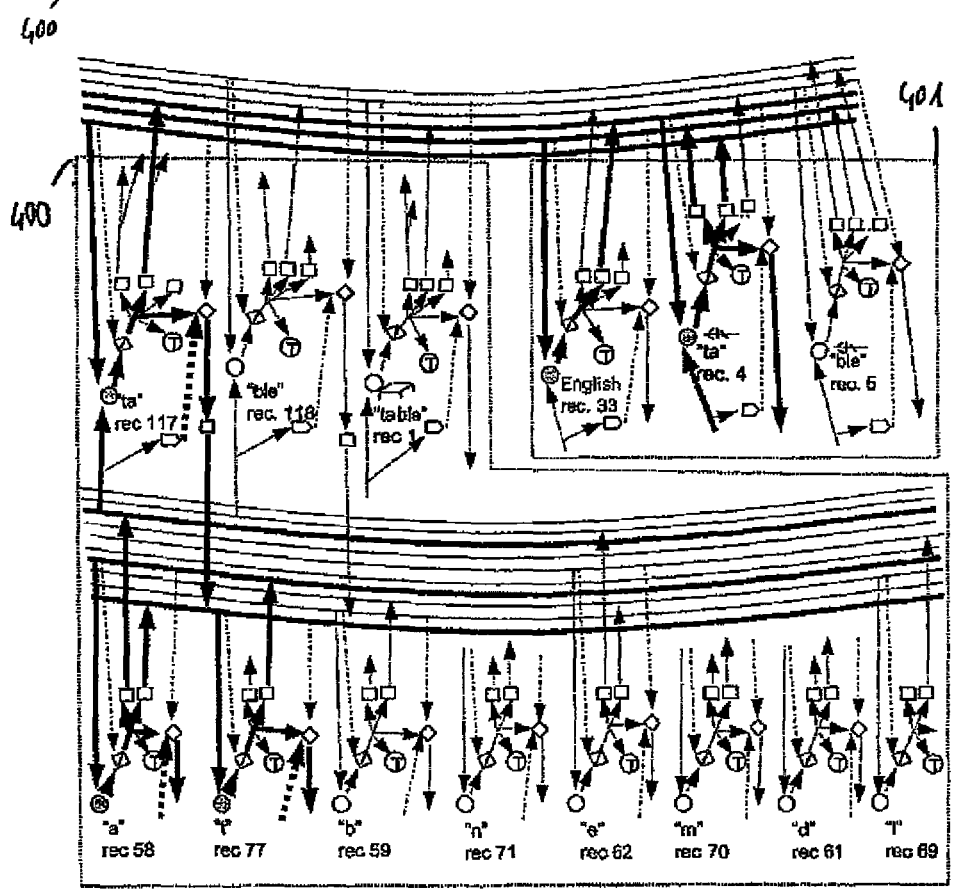
FIG. 18 illustrates a third part of reading a "table" according to an exemplary embodiment of the invention.

Because this sequence happened many times before, it is strong and has a high strength connection to the next higher level (see FIG. 17). On its way to the name pattern, the frequency neuron detects activity and immediately fires the "open"-frequency so the bridge neuron is opened. By the time the building circuit reaches the bridge neuron, it is open. The circuit can be activated. A "ta" pattern is identified from "t" and "a".

As this circuit is activated, tree neurons detect activity through their incoming connections and fire. It leads to the audio pattern of "ta" (see FIG. 18). That circuit is activated as well. As the audio pattern is activated, its tree neurons fire and activate an existing link to "English". In other words, through the hearing pattern, "ta" is identified to belong to the English language.

Figure 19:
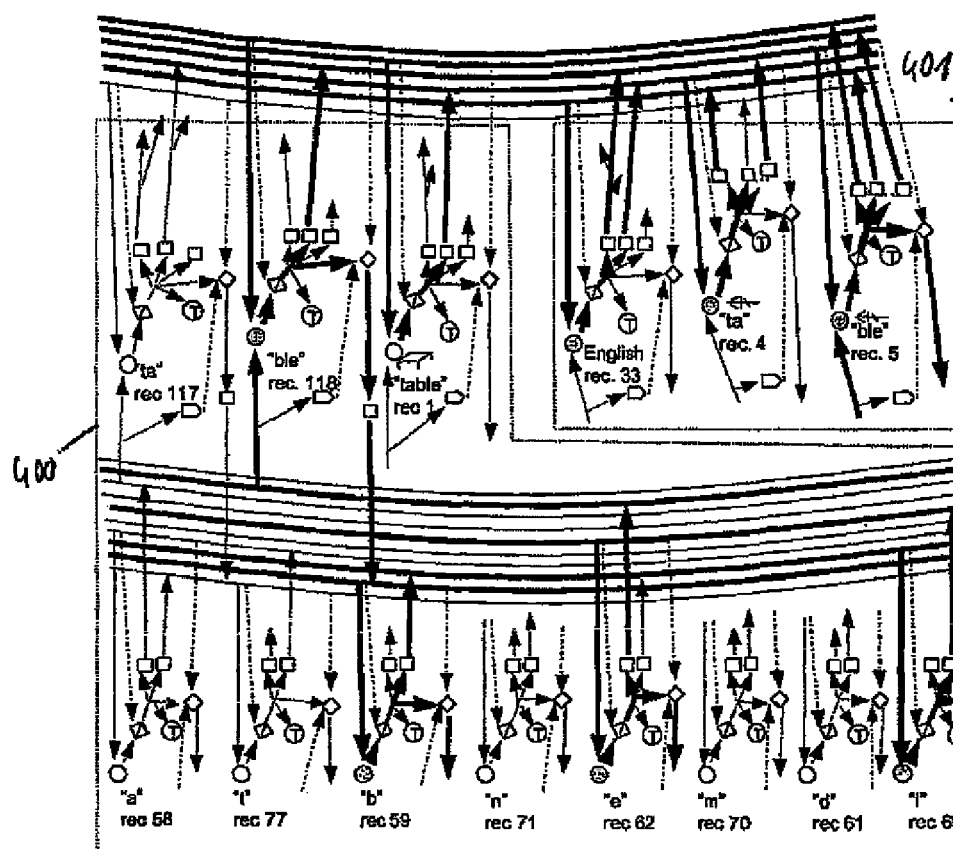
FIG. 19 illustrates a forth part of reading a "table" according to an exemplary embodiment of the invention.

Next are the letters "b", "l" and "e". Exactly the same happens here. Starting with the letter "b", FIG. 19 provides an illustration. This time, the hearing patterns of "ta" and "ble" have a connection with table. A single circuit of three patterns is established. The two hearing patterns link to the visual pattern of "table", which establishes meaning.

However, the Dutch expression for "ta-ble" is "ta-fel". While the spelling of the first two letters is identical, the sound is different. If the Dutch language is in use for a moment and the strength of the connection is higher than with the English language, it leads to the Dutch sound of "ta". Because the English language is however "on", an objective patterns sends a "no" frequency to the Dutch hearing pattern, making the English link the preferred connection. What works for parts of a words also works for full words. In other words, if the first part of a word passes the test but the second or third part fail, "no" frequencies are send to the parts or the Dutch language pattern, and the whole word is read again. But this time the circuits to the English sounds are established. The same principle is applied when the word passes the test, but there is no link to a primary pattern (the visual pattern in this example).

There is, however, another possibility: When sentences are read and those are in English language, the "English" pattern is kind of permanently on. As long as it is on, it could have active circuits to the common sounds of the English language. They can be active but not have the attention at the moment. As English is "on" the circuits with the English language overrule those with the other languages and become preferred choices.

Figure 20:
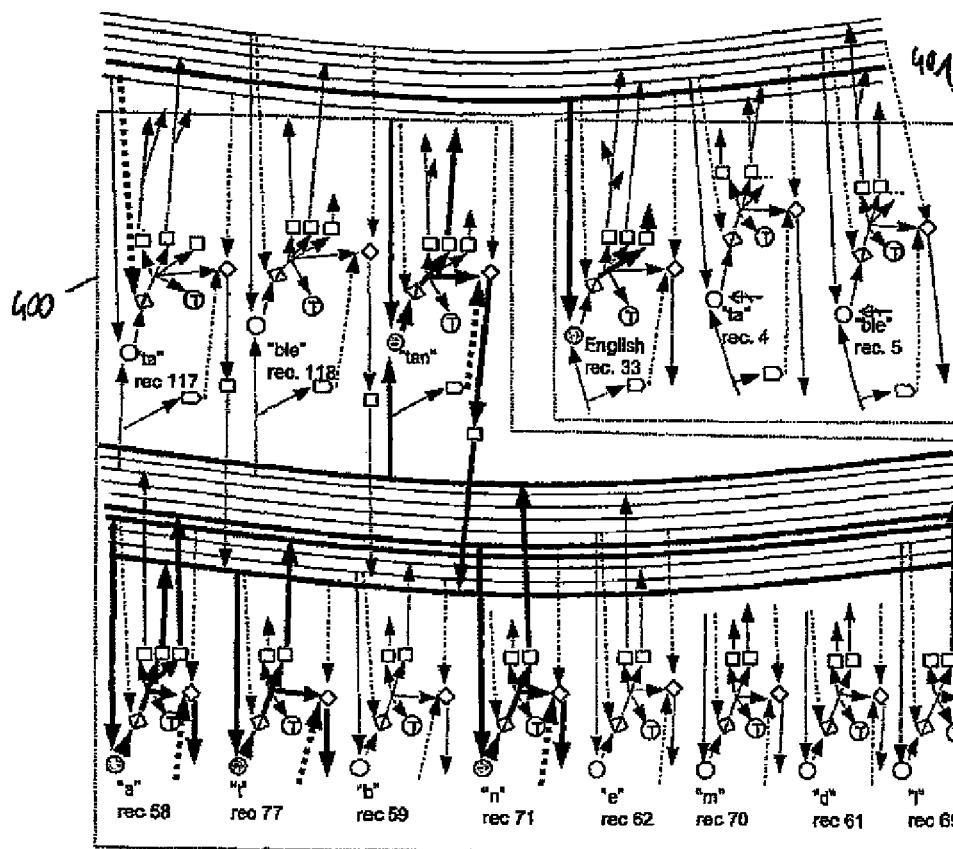
FIG. 20 illustrates reading "tandem" according to an exemplary embodiment of the invention.

If the word is "tandem", one way of overcoming the mentioned aspect is the following. The first attempt may be "ta". As objective patterns, however, do not find something that makes sense, "ta" is disabled through a "no"-frequency. This opens the possibility for another link. As illustrated in FIG. 20, "tan" of "tandem" is identified.

EXAMPLE 5

Figure 21:
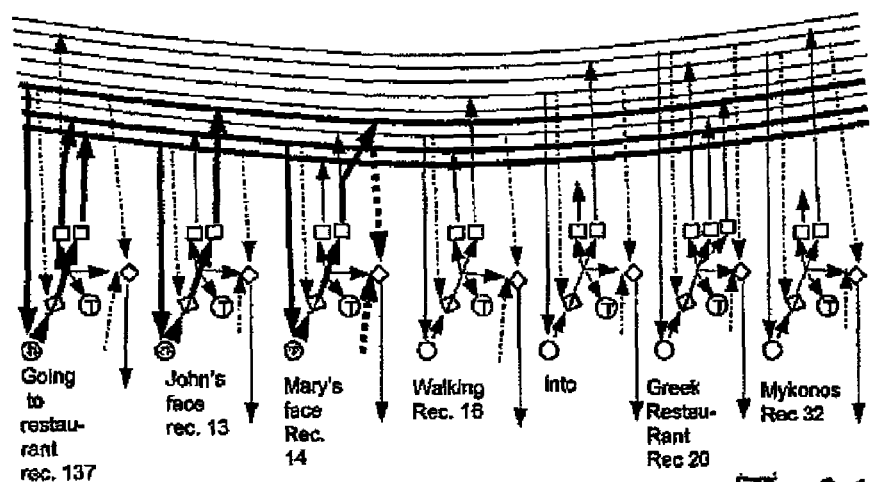
FIG. 21 illustrates a first part of remembering according to an exemplary embodiment of the invention.
Figure 22:
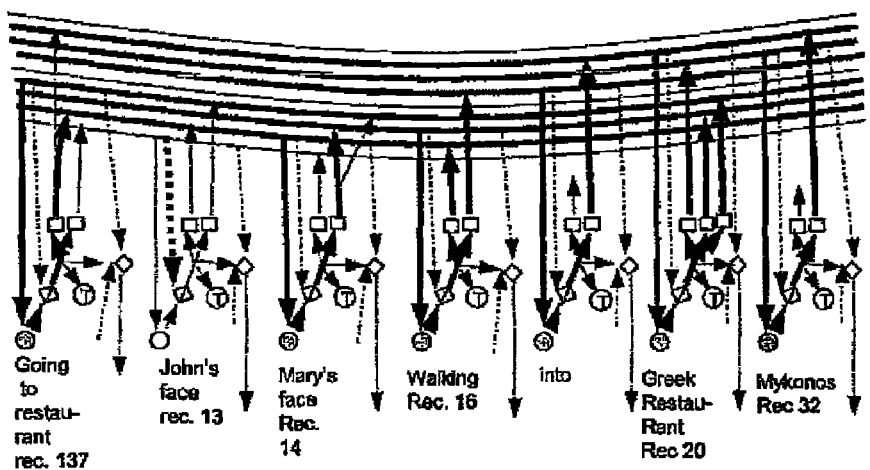
FIG. 22 illustrates a second part of remembering according to an exemplary embodiment of the invention.
Figure 23:
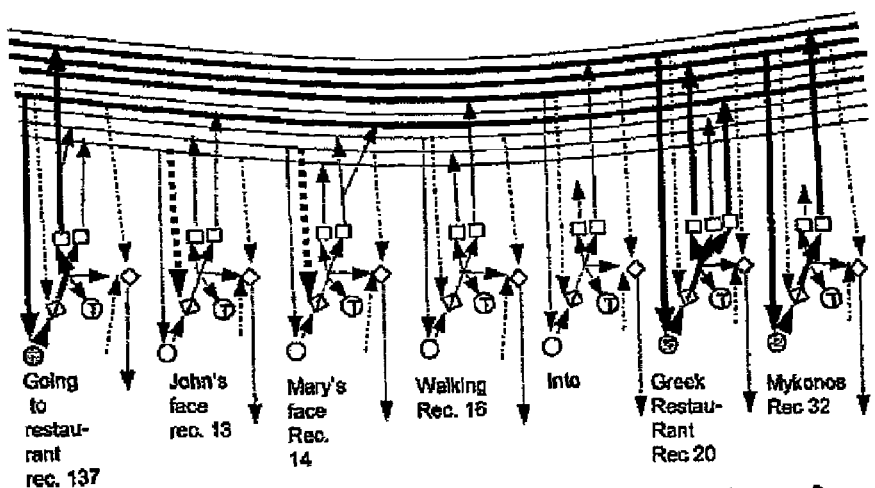
FIG. 23 illustrates a third part of remembering according to an exemplary embodiment of the invention.

FIG. 21 to FIG. 23 illustrate through an example how remembering or recalling can be done.

With regard to the symbols used in FIG. 21 to FIG. 23, reference is made to FIG. 6.

This example illustrates how a sequence of events is recalled or, in human terms, remembered. As John and Mary walked into the restaurant, this event was stored through the creation of patterns and association of patterns as it happened. Through, for example, another pattern, a circuit with the "Going to restaurant" pattern is activated (see FIG. 21). For example, through an "extend" frequency, circuits to John's and Mary's patterns are activated, meaning "going to the restaurant" was with John and Mary. If Mary's face shall be recalled, an "open" frequency is send to Mary's pattern and more patterns relevant to Mary's face become available.

Next, additional things of the event shall be recalled. One way of doing this is to send a "no"—frequency to John's pattern. This opens somewhat different circuits (see FIG. 22). A next step might be another "no"-frequency to Mary's pattern. With that, "going to restaurant" immediately leads to the patterns of a Greek restaurant and a name of Mykonos (see FIG. 23).

EXAMPLE 6

FIG. 24 to FIG. 27 illustrate an example how a patterns can lead to output and hence, the activation of something.

With regard to the symbols used in FIG. 24 to FIG. 27, reference is made to FIG. 6.

Reference numeral 2400 denotes a muscle activation area.

This example illustrates the use of output patterns. A sound for the word "table" is created. Given things going on in the context, the English pattern is assumed to be "on". Next, objective patterns conclude that sound needs to be created. Through the objective pattern or from creating the sounds for multiple words, just before, the speaking pattern is "on". Those two patterns have connections and circuits with the patterns that are used to create the sounds for words. As a word is said, there are one or more circuits. Immediately thereafter, a new circuit is created to say the next word. On the other hand, the circuits of words for which sounds have been created fade away and may become inactive.

Figure 24:
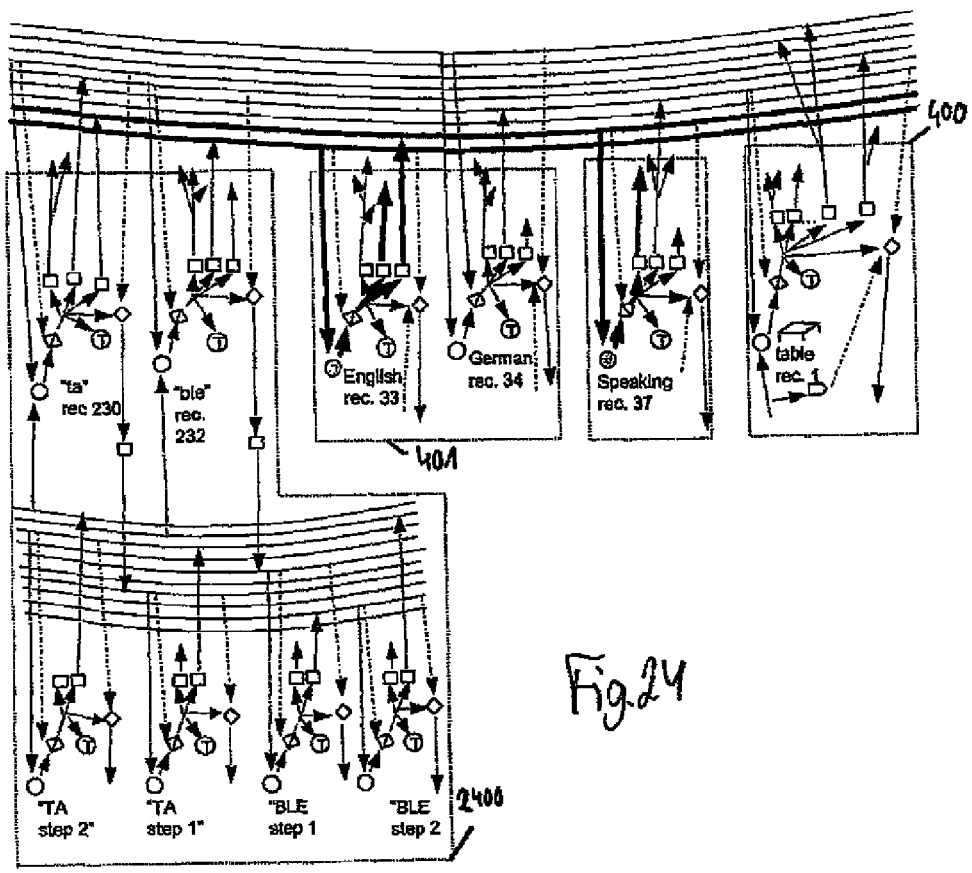
FIG. 24 illustrates a first part of how to say "table" according to an exemplary embodiment of the invention.

FIG. 24 illustrates the situation just before the pattern of "table" gets the attention. The pattern for "English" is "on". It has circuits active and most likely more circuits than illustrated in the drawing.

Figure 25:
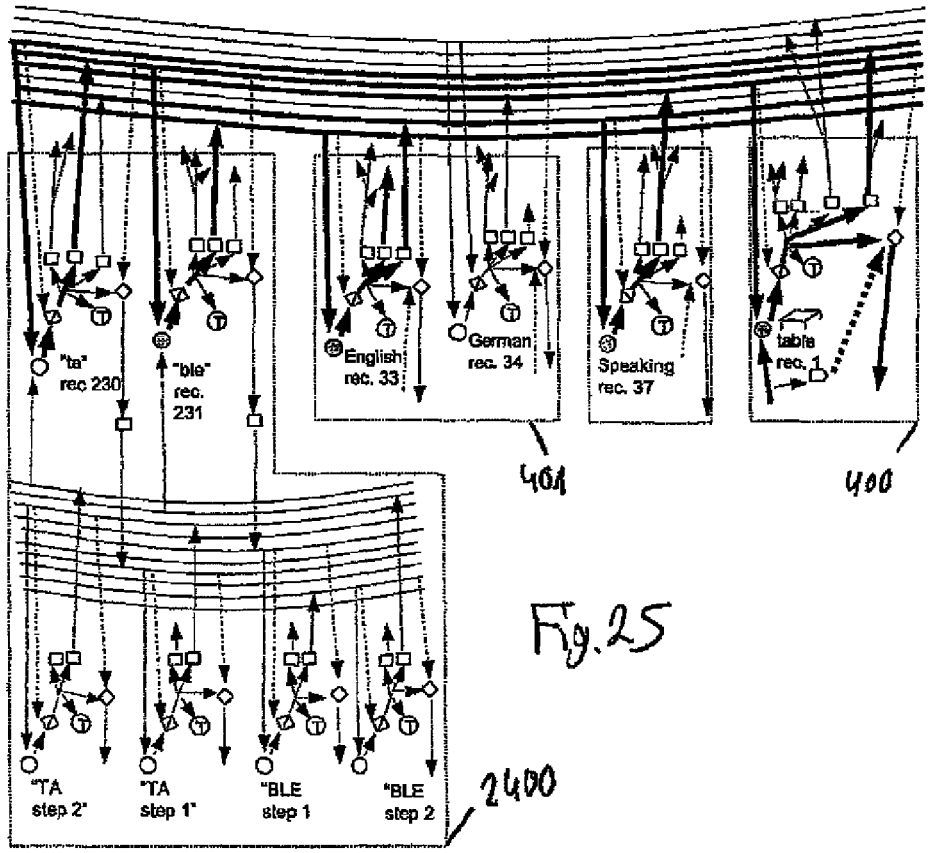
FIG. 25 illustrates a second part of how to say "table" according to an exemplary embodiment of the invention.
Figure 26:
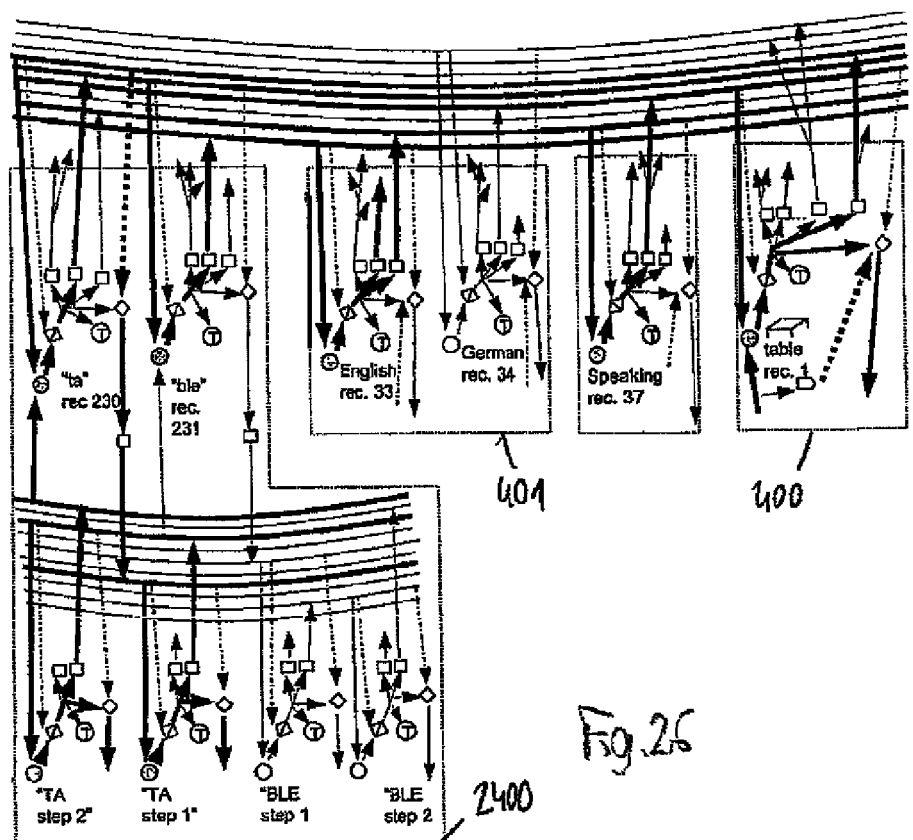
FIG. 26 illustrates a third part of how to say "table" according to an exemplary embodiment of the invention.
Figure 27:
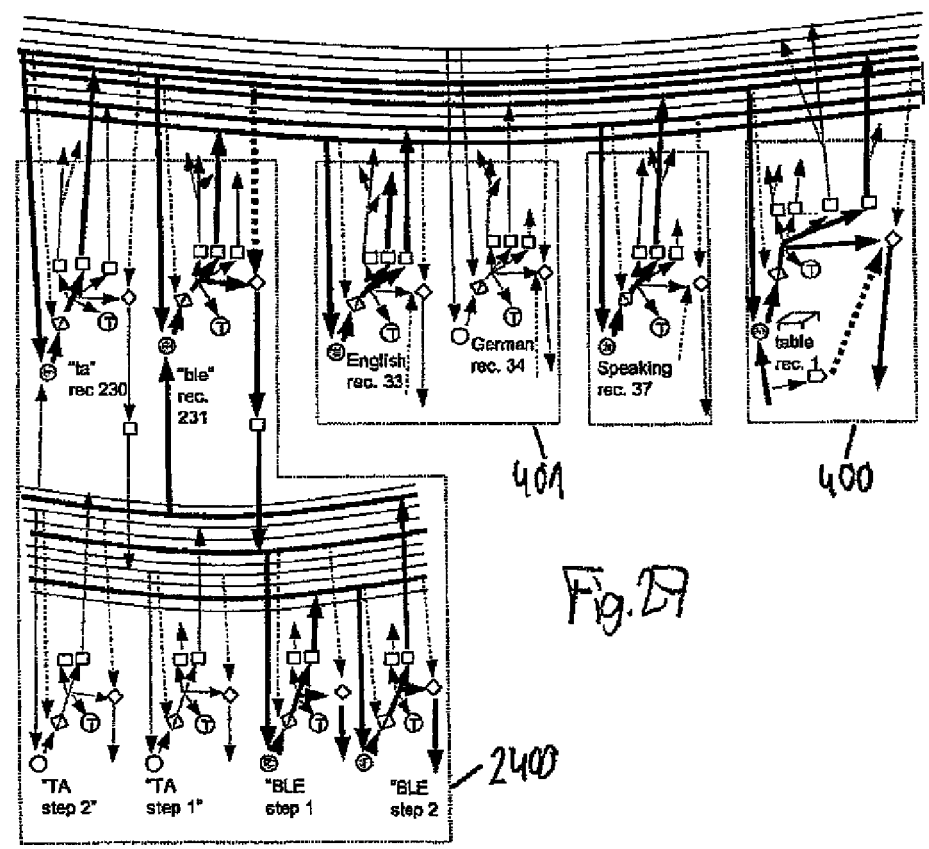
FIG. 27 illustrates a forth part of how to say "table".

As the pattern of a table gets attention, it becomes active. Through English and speaking patterns being part of the circle, it connects to the English language output patterns "ta" and "ble" (FIG. 25).

One application is to not execute them quite yet but wait for an "open"-frequency from an objective pattern. As it is sent (see FIG. 26), a sequence of patterns is activated, which in turn are connected to the mechanics that create the sound for "table". Quickly thereafter, the same happens for the second part of the word ("ble"; see FIG. 27).

Exemplary embodiments of the invention can, for example, be realized through hardware, software or a combination thereof.

The following illustrates one of more possible applications on how an exemplary embodiment of the invention can be realized through software simulating the functionality outlined above.

An advantageous features of the software implementation is a file structure. It may consist of one large file (see FIG. 28A to FIG. 28K), or of a plurality of smaller files.

The one large file contains the higher-level patterns, the relationships between the patterns and the strength. FIG. 28A to FIG. 28K contain text as well. However, the text is for illustrative purposes only. No text needs to be stored in the file. If this is needed, it is in the form of patterns as illustrated beneath the pattern column. The first column lists the record number. Whenever a record number is listed in another column, it points to the first column. For example, when the word "mouse" is heard, the pattern at record number 11 is activated. If the language spoken is English, it points to records 9 and 10, which both contain a pattern for the word "mouse", plus links to related patterns (in this case, the sound for "mouse" in English is the same as the one in German; spelling is different).

It is assumed a "primary" pattern is created. In the example of a mobile phone, it can be the visual pattern of a mobile phone, the sound pattern "mobile phone", the sound pattern "GSM" or any another pattern that is most appealing to understand the meaning of what a mobile phone is. For example, as one looks around, other people are seen, day in day out. Also, eyes, mouths, noses, ears, hair and others, that are all associated with "face", are seen. As eyes, mouth, nose, ears and hair patterns are activated by simply looking around, "face" is activated from each of those patterns. Through the number of activations, which increase the strength, the association "face" automatically emerges as the overarching or "primary" pattern.

Assuming the visual pattern of a mobile phone, record 8 in FIG. 28A to FIG. 28K, has emerged as the primary pattern for a mobile phone, any time an alternative (but already known) word is said, its association links to the pattern of record 8. It does not matter in which language it is said. If the Dutch word GSM is used, it links to record number 8. The same happens when an alternative word is used.

Similar arguments apply if the language is German and a sound of "mobile phone" phone needs to be created in English. This starts at record 8. As the "name neuron" is activated, the options of branch 1 become available. One of them is speaking. As this option is chosen, the next branch opens with three language options. English activates the following branch with options for the UK and the US. In the next branch, the UK option for "mobile phone" is chosen. As this happens, the links to the output patterns become available and can be executed.

Through this embodiment, it is possible to get things done within just a few steps. As the mobile phone gets attention, its pattern is activated, which activates the "name neuron". Inclusive this neuron, it takes only nine neurons (name neuron, 9844, 38, 37, 33, 9452, 6234 and 6345) to locate the first output pattern (6345) and only two more to locate the remaining output patterns (3423 and 3323). In terms of steps, the name neuron counts for one step and each branch means one more step. Since 9844, 38 and 37 are activated in parallel from the name neuron, this is one step. The same principle applies for subsequent branches. 37 activates 33, 34 and 35 in parallel, which counts for one more step. With that, the total number of steps involved to get to the first output pattern is five. In this case, only two more are needed to get to the final output pattern. This is not a precise match with what can be expected per illustrations through FIG. 1 to FIG. 27. However, it is a possible variation.

Software evaluates the options to be chosen. With objective patterns and strength available, this selection process is expected to be very simple. The fewer number of options to chose from are, the faster the selection process takes place. This means that, if there is only one option, the move to the next branch can happen with hardly any decision involved. In human terms and in the situation of intense heat, as the hand comes into contact with a flame, sensory information activates the patterns "hand", "intense head". This automatically activates the sequence "activate retraction of arm". With that, the only thought/background processing needed is "execute". As the sequence (multiple branches) is executed, it activates the output patterns that involve the retraction of the arm. Requirement for this is that this had to be done once before so the sequence is available.

The previous provides the fundamental principle by which input leads to action, often with less then 100 steps and sometimes with nearly no decision making involved. Moreover, it means that, for as long as there is no option to choose from, parallel processing can happen with nearly no or no involvement of a central place involved. In human terms, it means heartbeat, breathing and many other things can happen without central coordination. As there are no options to choose from, input patterns automatically lead to output patterns. It is a high or very strength that makes the need for central decision making obsolete. Heartbeat, breathing and many other things happen so often that the strength factor must be very high.

The previous implies that, as different types of input patterns are activated by the senses, they automatically activate output patterns. All of this happens the same time. Hence, heartbeat, breathing and many more functions happen automatically. Different sensory patterns are associated with output patterns that make the heartbeat go up or down.

In order to assess the relevance of a pattern, every pattern and every link gets a strength factor. Each time a pattern or link is activated, the strength factor goes up. This can be realized through a function like:

$$\text{strength factor} = \log_{1.5}(x) + 1$$

wherein x is the number of times the pattern or link has been referenced.

Since the number of references is not stored, but only the strength factor, a detour is needed to increase the strength factor each time the pattern or link is referenced again. The following function recalculates to the number of references. Adding one to it and running it through the previous function gives the strength factor for one additional reference.

$$x = 1.5^{\text{strength factor} - 1}$$

This however, is not sufficient. If this would be the way it works, the links within the same branch would always get the same increase in strength as the previous branch can activate all links in parallel. Links could not become more or less important. The most important could not turn up at the top and the least important could not turn up at the bottom. To overcome this conflict, the link that activates the next branch gets a small boost in strength. It gets a strength increase that is equal to two references. The same happens with the last link, provided it is executed and not just evaluated.

In FIG. 28A to FIG. 28K, record 8, the mobile phone, contains examples of strength factors. Through this mechanism, the links referenced and branched from more often, move up in the list. On the other hand, those rarely branched from move down the list. This may have particularly two advantages. First, it becomes more likely a relevant link is found quickly. The one with the highest strength is the best candidate. As a relevant link is found, there may be no need to further evaluate the branch. This saves valuable time. Secondly, those with a low strength factor can be removed to free up space for new and more relevant links.

In human terms, there are however other factors that influence how easy or difficult it is to recall/remember something: Interest and emotions. Records 163 to 186 contain values for interest and emotions. Those values represent references. As interest and emotions change over time and as this can happen rather quickly, it needs a loose connection rather a fixed one. Hence, it is assumed interest and emotional links are only associated when a pattern is actually activated. Thereafter, the connection is lost. On the other hand, while connected, it is used to boost the strength of the associated patterns and links. This requires an additional formula.

As the pattern is activated, its reference counter goes up by one. Moreover, the strength and/or emotion add a few "references". In the example of record 8, there is a temporary association with record number 170. 170 gives a reference counter of 4. Hence, the strength factor of the mobile phone pattern is recalculated using 5 additional references. For the links, the same could be done. However, this would create too much of a boost and could create a conflict with the aging and cleanup process. The argument becomes that there should be a reduction in boost, the further the step or branch is away from the name neuron or pattern column. For this purpose, following is an example of a formula that could be used:

$$\text{Reference boost} = (1/[y+1]^{0.3} - 0.25) \ast z$$

wherein z is the interest or emotion value, and y is the branch number.

This reference boost is then added to the references that are used to calculate the strength factor of the links branched from and the last one that is executed. In the case of the mobile phone, the interest boost is 4 references. For branch 1, this means the reference boost calculates to $$(1/[1+1]^{0.3} - 0.25) \ast 4 = 2.25$$

With this formula, the $2^{nd}$ branch gets a boost of 1.88 and the $3^{rd}$ branch 1.64. That is of course only for those options that connect to an option in the next branch and for the last one that is executed.

Up to now, only input, output and value pattern have been discussed. But, there needs to be something that drives for actions. That may be something to achieve within the next 30 minutes, the next week or in the years to come. This is where objective patterns come in. They lead to action. Many of them are kind of constantly active. For example, "read sentence until finished" (record number 134 with its links) with a secondary objective of "read word until finished (record number 135 with its links) are needed so a sentence is read.

Ageing and cleanup is done through reducing the strength. For all strength values that have not exceeded the high strength level that makes the strength permanent, a formula can be used to reduce the strength, for example, each day. It could, for example, involve a formula that causes a stronger reduction in strength the further the connection is away from branch 1. In certain cases, a technique that overwrites existing patterns and links with new ones is imaginable as well. Through examples, the principles of the software approach will be outlined.

This sensory memory needs a somewhat different approach. Sensory information, coming from the eyes, ears and so forth is always "on". However, this is not the case for the eyes while a person sleeps but it is for other senses. Rather than having a strength reduction technique, it makes sense to have new information "simply" overwrite old information. The only other requirement is that, as a neuron becomes inactive, the links behind it become inactive as well. In the meantime however, patterns are identified from the sensory information. And, it are those patterns that become the basis for short and long term memory. For those patterns and their links, the decreasing strength technique is applied.

It is possible that links of low strength are not freed but overwritten by new links that have a higher strength. This would mean an even more efficient use of resources.

Architects dream up new buildings and a tennis player can give a ball a different twist, a twist that has not been tried before. If this would take place from stored patterns and links, it is not imaginable that new buildings can be dreamed up or a tennis player could use a new twist. Concluding, something is needed to take decisions, and it must be able to do a few other things (decision making). It is possible that this is comparable with a computer program. However, experiences with the system according to the invention suggest this decision making is far away from the complexity of computer programs. It probably involves some rather simple routines.

For the reference model, decision making might be the following:
  Objective pattern driven decision making when multiple options are provided within a branch Going through and evaluating patterns and links without executing them; this includes recalling existing patterns and links The decision to "execute" output patterns The combining of existing patterns and links for the creation of new patterns and links.

The previous implies some sort of central processor may be needed. It may be needed to coordinate the decision making and other tasks. Though, compared to the processor and programming known from computers, it must be simple. It does not need to be complex because the possible answers for many decisions are readily available through the links and patterns. Because of a "100 step rule", i.e. the goal to obtain a result within 100 computational steps, it would not be surprising if it is extremely simple and very different to what we know as computer processors and programs.

Whatever the processor in the human brain is, it still needs to know which patterns, branches and links are active. Actually, the following functions are needed:

Somehow, the active but not automated patterns must be made known to the processor The processor must be able to send a few very simple instructions such as "inhibit link" or "execute" to the name neuron and to the link neurons The processor must be able to identify the links behind a pattern so it does not mix up links of different patterns and branches.

Fully automated tasks are those that do not need any thought, for example, heartbeat, breathing and so forth. Semi automated tasks are those that need an "execute" command to the name neuron or link neuron. This starts the automatic execution of the links behind it. It starts a sequence. For example, in order to move a leg forward, the semi automated task must be started. Once this is done, the rest, like activating additional muscle to stay in balance, happens automatically.

As before, if every active pattern and link would be made known to the processor, the amount of data would be massive. Hence, there needs to be a mechanism that prevents feeding the processor if no decision is needed. Therefore, a high strength and no option to choose from, disables the sending of information to the processor. A (very) high strength also means execution of output patterns is automatic, without any intervention from the processor.

EXAMPLE 7

There are many types of restaurants (record 19 in FIG. 28A to FIG. 28K); Greek, Chinese, fast food. Record 19 in FIG. 28A to FIG. 28K lists some basic criteria for restaurant, establishing what a restaurant is. From there, links to, for example, the Greek restaurant (record 20), provide more specific patterns, identifying what a Greek restaurant is. In this case, it contains some additional information because the appointment with John and Mary is at a Greek restaurant in Amsterdam. It is called Myconos.

The moment John and Mary are seen for the appointment, many patterns and links are activated and new links established. They provide more detail as to how John (records 13 and 140) and Mary look like. Much of it may only be perception. If not picked up by an objective pattern and strengthened, the links fade away quickly. So do unique patterns. Record 137 (going to the restaurant) records things that got some attention during the walk to the restaurant. There was some interest causing their strength to be at such a level that it can be recalled later.

John, however, is not seen constantly during the walk and in the restaurant. The eyes move to Mary and to other things around. This means patterns and links identifying John are deactivated and activated repeatedly. As they are reactivated, they are referenced and their strength goes up. More details can be recalled later. Record 13 contains such information and record 32 contains information about the Myconos restaurant. But, it is not just the fixed things that are recorded. The same happens with the moving things and conversations.

FIG. 28A to FIG. 28K illustrate an example with a file structure if the corresponding embodiment of the invention is implemented in part or completely through software. Record numbers above 1,000 are for illustrative purposes only. Record numbers below 1,000 relate to an existing record in the table.

To go back one more step: What is it that drives to make an appointment with John and Mary in the first place? This is where objective patterns come in. In this case, it may be an pattern of "let's have a good time". It is probably an objective pattern of "having something to eat" that makes us find a job so we can buy food. And, it is probably a pattern of "drive to work" that makes us drive to work (record 23) each day.

EXAMPLE 8

A tennis game starts with a service. The opponent returns the ball. It is said that the speed of the ball, flying from one side of the court to the other side, is faster than a human is able to calculate the trajectory, identify the response, re-evaluate the trajectory multiple times as the ball comes closer and activate the right muscle sequences so the ball is returned. Indeed, with the 100 step rule, doing all the calculations necessary is a non-starter. Even with a fast computer, this is a rather difficult thing to do and, it is believed that no robot has mastered it yet. Here is how the reference model solves the problem.

First and foremost, there are a number of objective patterns, records 141 and 143 to 148. Those not only tell what to go for (return ball, win point, . . . win match) but they also drive for action. Return tennis serve (record 147) tells to go to a specific place, wait for the serve and return it. For anyone to return a tennis serve of high speed, lots of practice is needed. This means many patterns and sequences of patterns are readily available from earlier practice. When it comes to returning the serve (or any other activity within the game), the stored patterns and links only need to be activated and executed. In this case, the service return starts with tennis serve T4 (record 149).

Just before the serve is done, the position of the body parts, the arm movement and even the expression of the opponent's face contain information as to what can be expected. In this case, the pattern of tennis service T4 is activated. As this happens, it provides three trajectory options through which the ball can be expected. As the ball comes closer, trajectory T87 (record 150) is confirmed through pattern recognition. As soon as this happens, execute commands are given to go into branch 2 and 3 of record 149. This makes the arm move to the back and the body to move one step to the right.

It is that a little spin and the ground can change the ball's path. Hence, it is important to have a few sub-trajectories readily available. In the example, sub-trajectory ST8 (record 153), which is already an option, gets confirmed very soon after the ball hits the ground. This execution activates a few options that the ball can take. In this case, the ball has a spin I-7 effect (record 155). This pattern contains a short sequence for the activation of arm muscles. Its first entry is a pattern that establishes at which distance from the ball the muscles need to be activated. As soon as this distance is reached, the execute command is given and the muscles activated. The arm is moved forward per arm muscles O3 (record 157) and, in parallel, the hand muscles O2 (record 158) are activated to turn the racket to the exact angle needed.

Both muscle activations contain a sequence. This is to activate different muscles during the movement. It gives the movement and hitting the ball precise control. Instead of simply hitting the ball and giving it a direction back over the net, it becomes possible to give it a specific direction, inclusive a spin effect.

For top-level players, practice in combination with the ability to give the patterns and links strength through interest and control, is what creates optimum patterns and links. The clearer they are, the fewer options. Few, preferably no option, means little to decide on, no waste of time and very fast execution. Execution can become semi automatic, possibly fully automatic for certain brief parts. Even if a pattern isn't readily available, this doesn't cause too much of a hassle because the central place or software can predict new patterns and links from existing ones and execute them. With lots of patterns available, only little changes are needed, which causes little risk for execution. If a pattern or sequence is not efficient, it can be tried with a little change at the next opportunity.

Tennis is a game of surprises, and here is one. It is not only the tennis serve that is extremely fast. From a certain speed onwards and a little bit depending on where one is on the court, it takes too much time to get to the right spot. With that, it is impossible to return the ball. Waiting for the ball's trajectory to predict where the ball will hit the ground is simply too slow. One technique to overcome this problem is to take chances and move to left, right, back or forth in the hope that's where the next ball will be. It is that, if good players play against opponents of a lower class, the good ones are almost always at the right spot, even if the opponent plays very fast balls. Surely, they do not use chance for this.

Just like is the case with the tennis serve, the good players use the opponent's position on the court, his or her leg, arm and head position; the racket's position, its angle and a few other things. This is stored as patterns. It includes potential trajectories. With many, many such patterns available, possible trajectories are known before the opponent hits the ball. This provides just sufficient information and time to be at the right place the right time. Tennis players know this as anticipation. The tricky part is this: What creates those pattern?

At a relatively low playing level, waiting for the ball to leave the opponent's racket, is sufficient to get to the right spot on time. Hence, there is no need to anticipate. Then, as the playing level improves, it may be understood that something is missing. Movements are too slow, the ball is missed too often and the movements require too much effort. This means too many trajectory patterns start after the ball leaves the opponent's racket. This is bad news, because those patterns are of high strength. It requires quite some practice to build sufficient anticipation patterns that have clear options before the ball leaves the racket. Moreover, there are many unnecessary options to choose from. This decision process takes time when very fast decisions are needed. It will take lots of practicing and a long time until inefficient patterns fade away and the more efficient patterns and links are semi automated.

This example contains three types of patterns, input, output and objective patterns. Input and output patterns are only "on" for brief periods of time. Objective patterns, however, are "on" for as long as needed. "Win match" (record 141) is on for as long as the match lasts and probably also while watching tennis. These objective patterns are kind of at the back of the mind. They drive the action. Whether there is a conscious thought involving such a patterns depends on the moment and the interest at that moment. Obviously, the interest level of "win point", "win game" and "win match" are high during the heat of the match. Though, there are lots of variations during a match. As variations come in, concentration weakens. It is then a matter of getting sufficient interest into the objective patterns. This in turn makes it easier to think up trajectory and other patterns early on, which improves the game.

During a game of tennis, there is of course a lot more going on than listed above. For example, during any move, balance is lost if not corrected. This is where the balance objective (record 39) and automatic corrections come in if some out-of-balance situation is detected. Of course, the muscle activations during a game of tennis will have balance incorporated because they have been practiced many times before. It is that some new situations can emerge for which no pattern is available. In those cases, the balance objective is of very high interest. Let's explore this not on the tennis court, but with a boat trip over the ocean.

EXAMPLE 9

For anyone not used to waves, the ups and downs easily cause sea sickness. But what is it that causes sea sickness? Today it is well understood that the inner ear provides sensory information about the vertical position. But it is not just the inner ear that provides data. The current muscle position is equally important. It would not make sense to move a leg if it is in the right position already. Hence, the current position must be known. Moreover, the eyes provide data as well. The latter was nicely demonstrated in a documentary in which artists created a human triangle. They stood on each others shoulders and there were multiple rows of people on top of each other until only one was at the top. What worked well was quite different when the light was switched off. The human triangle was not able to stay in balance. It broke apart. It was established that horizontal lines are important to balance. Scientists argued that the changing horizontal lines confuse balance and cause sea sickness.

In the following, this will be discussed in the context of the reference model.

With the lights on, everybody in the human triangle was trained (had patterns and links) to compensate when somebody moved and an out of balance situation was about to occur. With lights switched off, the same patterns and links were still available. However, the eye patterns did not get activated. Record 40 provides an example with lights switched on. The inner ear (or a sensor simulating or fulfilling the performance of the inner ear) provides the current vertical position. Muscle data (which may be captured by a suitable sensor) provides information about the muscle positions. In normal situations, this is sufficient and one can walk with the eyes closed without falling. However, in more challenging situations like playing tennis or with the human triangle, this data is insufficient. Eye data is used as well.

Branch 2 of record 40 contains links to patterns created from eye data. Lights switched off means those patterns are inactive but one option has to be chosen to get to the patterns that activate the proper muscles. Obviously, with lights switched off, this is a lottery. Soon an inadequate option is chosen and the wrong muscle is activated. This brings the human triangle closer to an out of balance situation. Others in the triangle try to correct but run into the same problem. The triangle has to break apart.

It appears, sea sickness is created in a similar way. As eye-balance data is created from fixed surfaces, it is always built form fixed horizontal lines. On the ocean however, with some waves, there is no fixed horizontal line. The inner ear patterns, the muscle patterns and the eye patterns do not match anymore. The options needed in branch 2 of record 40 are not available or lead to incorrect muscle activation, which needs to be corrected over and over again. Somehow, this expresses itself in sea sickness. And, it probably lasts until sufficient new patterns and links are established.

Survival patterns and parent to child transfer of patterns and links will be discussed in the following. Somehow certain patterns and links must be transferred from parent to child. Without it, the patterns and links, necessary for the functioning of the body, could not be available at birth. Accepted, many patterns and links can develop while the embryo growths. However, there are also those tasks that cannot be trained during this time. But, they are available after birth and, without practicing.

Just born babies can swim. In the animal kingdom, wilder beasts and antelopes can walk, even run, just an hour after birth. After hatching, turtles immediately walk to the ocean. There are many more examples. What takes weeks, months, even years of practicing with children is readily available with many off-springs in the animal kingdom. This can only work if the information needed is transferred from parent to off-spring. Hence, some sort of "survival patterns" and "parent to child transfer" is needed for the reference model. That said, there are certain questions: How are survival patterns and their links identified? What is it that ensures they are transferred?

In answering the first question, "strength" is used to identify survival patterns. With the strength argument, it are those patterns and links with the highest strength that get transferred through the DNA. For many of the body functions, this very high strength is automatically established. Surely, 70 heartbeats a minute and related sensory information automatically creates a very high strength. Records 191 to 203 show a couple of examples. On the other hand, there are survival patterns that do not have a high repeat rate.

This will be explored through assuming there was a time when antelopes did not have enemies and new born took weeks to develop walking and running skills. It is further assumed that then came lions. What surly happens in such a situation is that newborns are lost to lions. Applying the reference model, it means emotions would be created; emotions of the strongest kind. With the herd running away from the lions, run-away patterns and extreme emotions are "on" (i.e. record 204) with each animal. Just like is the case with other interest and emotional values, these values get used for the strength of associated patterns and links; in this case the run-away patterns and links. As those are repeated during the chase, probably "thought of" as the animal has spotted something dangerous but does not run yet, and as the herd is confronted with lions repeatedly over the months and years, the strength builds up over time.

At some point, this strength reaches a threshold that makes the run-away pattern survival pattern. Through the DNA they are transferred to the off-spring. For capacity reasons, this may be at the expense of other patterns and links, which may not qualify as survival patterns anymore. As, in this example, the herd experiences rather similar emotions, its not just one antelope through which it happens, but it are many. The newborn equipped with the run-away patterns are in a much better survival position than those without. At this point, natural selection takes its cause. Lions will find it easy to kill new born that cannot run.

In the following, referring to FIG. 29, a device 2900 for processing information according to an exemplary embodiment will be described.

The device 2900 comprises an input unit 2901 for perceiving information. Furthermore, the device 2900 comprises a recognition unit 2902 for recognizing elementary patterns based on the information perceived in the input unit 2901. Furthermore, the device 2900 comprises a neural network 2903 which can be designed as described above. The neural network 2900 is adapted for processing the perceived information or, the information recognized by the recognizing unit 2902.

Furthermore, a decision taking unit 2914 is provided which may, at a central place, take a decision based on a result of the processing of the perceived information by the blocks 2901 to 2903.

An output unit 2904 connected to the neural network 2903 (and optionally to the decision taking unit 2914) is adapted to output a result and/or to perform an action based on the decision taken by the decision taking unit 2914.

In more detail, the input unit 2901 comprises a video camera 2905 for capturing image information of an environment of the device 2900. Furthermore, the input unit 2900 comprises a microphone 2906 to capture audio information, particularly voice information, from the environment. Beyond this, a gas sensor 2907 is provided within the input unit 2901 which detects olfactory information, that is smells or tastes which are transported by gas in the environment.

The fundamental raw data captured by the devices 2905 to 2907 are provided to corresponding recognition blocks 2908 to 2910. More particularly, the output data of the camera 2905 are provided to an image recognition unit 2908 which is adapted to perform image processing with the captured data. For instance, a face of a person may be detected by the image recognition unit 2908 by image data processing. Furthermore, a sound or voice recognition unit 2909 may be provided which may be capable of transferring speech detected by the microphone 2906 into a text. In a similar manner, an olfactory recognition unit 2910 derives the olfactory information of the environment as captured by the gas sensor 2907. For example, the olfactory recognition unit 2910 may detect the perfume used by the person which is shown on the image captured by the camera 2905 and which speaks so that the microphone 2906 may detect the voice of this person.

Thus, the first level recognition by the recognition unit 2902 may transfer the detected data of the components 2905 to 2907 into low level pattern information, using, if desired, methods and apparatuses known from the prior art.

Figure 29:
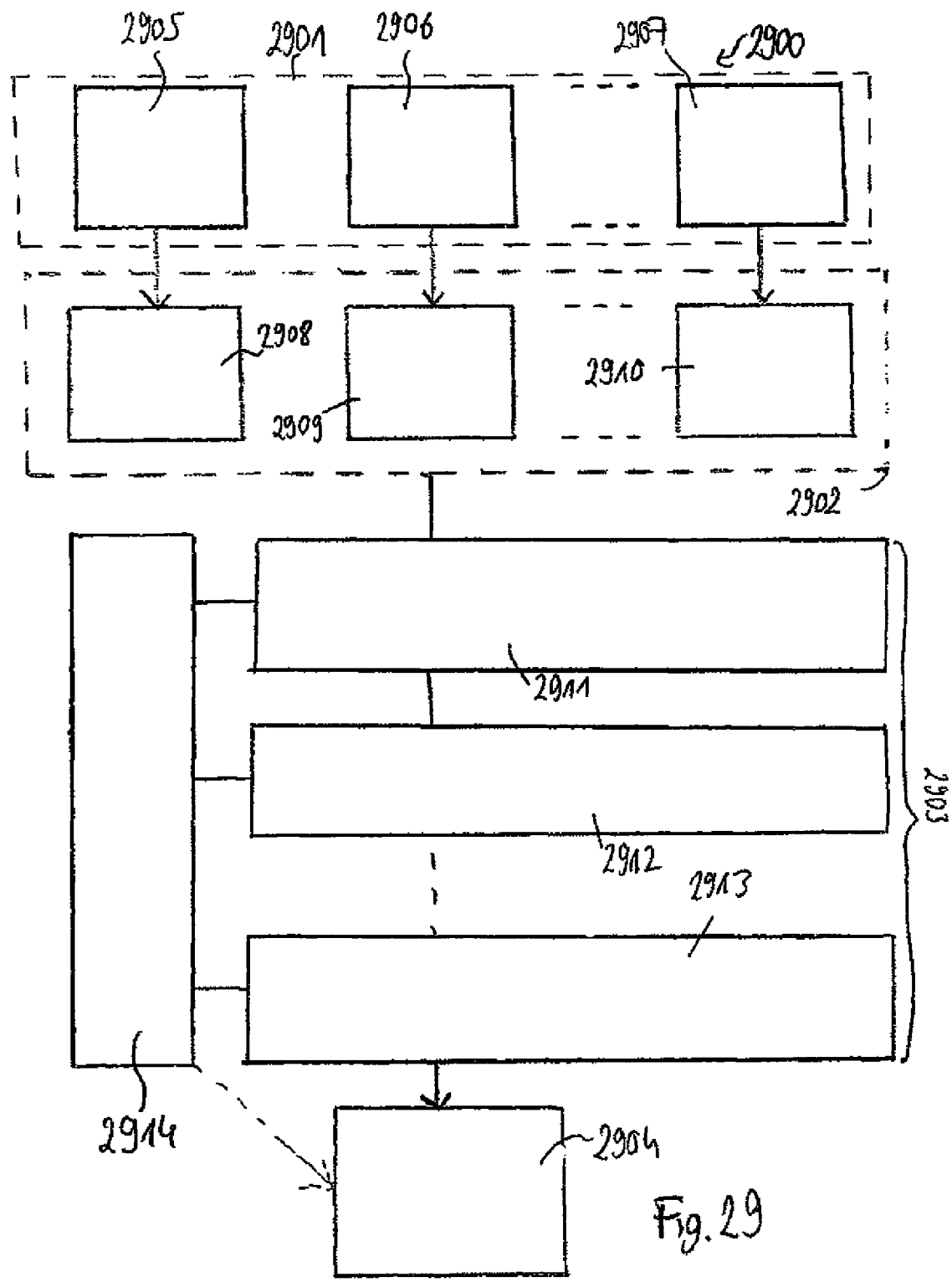
FIG. 29 shows a device for processing information according to an exemplary embodiment of the invention.

This low level pattern input information is provided to the neural network 2903 which has a hierarchical structure of a second level recognition unit 2911, a third level recognition unit 2912 and, if desired, further level recognition units (corresponding to units 301 to 305 of FIG. 3) which are not shown in FIG. 29. Finally, an end level recognition 2913 is provided. From level to level, the recognized patterns become of a higher order and include increasingly abstract or accumulated or combined information. After having passed the end level recognition unit 2913, the derived information items are provided to the decision taking unit 2914 which takes a decision based on a result of the processing of the perceived information by the previous stages. The decision taking unit 2914 is engaged when a decision is needed. However, in many cases, no decision is needed. Input patterns can lead directly to output patterns (and cause an activation through the output unit).

The output unit 2904 then activates, for instance a sound and/or an image.

Thus, the system 2900 is capable of working as a system realizing functionality similar to a human brain. For instance, after having processed the data concerning the image, the speech and the smell of the person, the output unit 2904 may, for instance, welcome the person by emitting a sound "Good morning Mr. Brown". Or, the output unit 2904 may recognize that it has been detected that the person is Mr. Brown, who likes cookies for breakfast. Consequently, the output unit 2904 may prepare a breakfast for Mr. Brown based on his known preferences. Or, the output unit 2904 may recognize that Mr. Brown is wearing a suit and a tie and may determine from this information that it is very likely that Mr. Brown now goes to work. Thus, the system 2900 can function as some kind of robot.

In the following, referring to FIG. 30, a computer system 3000 will be explained on which a neural network according to an exemplary embodiment of the invention may be installed or operated.

Figure 30:
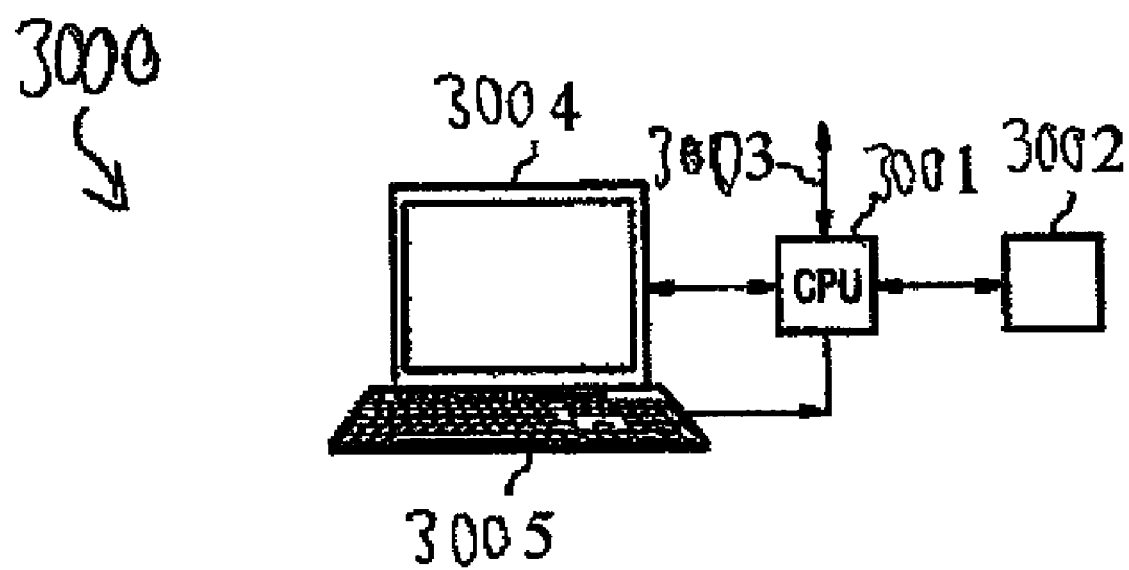
FIG. 30 shows a computer system on which a neural network according to an exemplary embodiment of the invention may be installed or operated.

FIG. 30 depicts an exemplary embodiment of a data processing device 3000 according to the present invention for executing an exemplary embodiment of a method in accordance with the present invention. The data processing device 3000 depicted in FIG. 30 comprises a central processing unit (CPU) or image processor 3001 connected to a memory 3002 for storing data, such as data remembered during the learning procedure of the neural network. The data processor 3001 may be connected to a plurality of input/output devices, such as sensors for detecting optical, audible, olfactory or other data or a user interface via which a human user may control or regulate the entire system 3000. The data processor 3001 may furthermore be connected to a display device 3004, for example a computer monitor, for displaying information or a decision taken in the data processor 3001. An operator or user may interact with the data processor 3001 via a keyboard 3005 and/or other output devices, which are not depicted in FIG. 30. Furthermore, via the bus system 3003, it is also possible to connect the processor 3001 to connected apparatuses.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Implementation of the invention is not limited to the preferred embodiments shown in the figures and described above. Instead, a multiplicity of variants are possible which use the solutions shown and the principle according to the invention even in the case of fundamentally different embodiments.

The invention claimed is:

1. A neural network, comprising:
a plurality of neurons;
a plurality of wires adapted for connecting the plurality of neurons, wherein at least a part of the plurality of wires comprises a plurality of input connections and exactly one output connection and/or at least a part of the plurality of wires comprises exactly one input connection and a plurality of output connections;
wherein the plurality of neurons are grouped to at least two groups of neurons, wherein the groups of neurons are arranged to define a hierarchic structure, a lower group of neurons of a lower hierarchic level adapted to recognize a pattern of information which is input to the neurons of this lower group and which pattern is of a lower level compared to a pattern to be recognized by neurons of a higher group of neurons of a higher hierarchic level;
wherein the plurality of wires are grouped to at least two groups of wires as bunches of wires, wherein neurons of a respective group of neurons are connected between two groups of wires;
a processor arranged to receive the exactly one output connection and/or the plurality of output connections from the plurality of neurons; and
a memory coupled to the processor;
wherein a strength value is generated in the processor, associated with a connection between different neurons, and stored in the memory, wherein the strength value of a particular connection is indicative of a likelihood that information which is input to the neurons propagates via the particular connection, the strength value of each connection is modifiable based on an amount of traffic of information which is input to the neurons and which propagates via the particular connection and/or is modifiable based on a strength modification impulse; and
wherein at least a part of the neurons of a respective group of neurons are interconnected to one another by means of connections.

2. The neural network of claim 1, wherein the strength value of a connection is decreased in case of absence of a propagation of information which involves a neuron via the particular connection for more than a predetermined time interval.

3. The neural network of claim 1, wherein at least one of the plurality of neurons is adapted such that a signal to be sent by this neuron is sent via a connection of this neuron to other neurons which connection has assigned the highest strength value among all connections of this neuron to the other neurons.

4. The neural network of claim 1, wherein the strength value of a connection is prevented from falling below a predetermined value in case that the strength value reaches or exceeds the predetermined value.

5. The neural network of claim 1, wherein a particular connection is eliminated in case that a frequentness of propagation of information via the particular connection, which information is input to the neurons, falls below a threshold value.

6. The neural network of claim 1, wherein at least one of the plurality of neurons is connected to at least one of the plurality of wires, wherein exactly one or at most one of these connections is active at a time.

7. The neural network of claim 1, wherein at least one of the plurality of neurons is connected to at least two of the plurality of wires, wherein more than one of these connections are active at a time.

8. The neural network of claim 1, wherein at least one of the plurality of neurons is disabled by default and is to be enabled only upon receipt of an enable signal.

9. The neural network of claim 8, wherein at least one of the plurality of neurons is adapted to detect an incoming information and to send the enable signal upon receipt of the incoming information.

10. The neural network of claim 1, wherein at least one of the plurality of neurons is enabled by default and is to be disabled only upon receipt of a disable signal.

11. The neural network of claim 1, wherein the plurality of neurons include at least two different types of neurons having different properties or functions within the neural network.

12. The neural network of claim 1, wherein different groups of neurons are assigned to process information related to different human senses or non-human senses.

13. The neural network of claim 1, wherein at least one of the plurality of neurons is adapted to send at least one of the signals of the group consisting of a signal to activate a circuit formed by at least two of the plurality of neurons, a signal to deactivate a circuit formed by at least two of the plurality of neurons, and a signal to connect different circuits each formed by at least two of the plurality of neurons.

14. A device for processing information, the device comprising:
an input unit for perceiving information;
a neural network embodied on a computer coupled to the input unit for processing the perceived information to generate a result, the neural network including a plurality of neurons and a plurality of wires arranged for connecting the neurons, wherein at least a first portion of the wires include input connections and exactly one output connection and/or at least a part of the wires comprises exactly one input connection and a plurality of output connections, the plurality of neurons grouped to define a hierarchic structure, a lower group of neurons of a lower hierarchic level adapted to recognize a pattern of information which is input to the neurons of this lower group and which pattern is of a lower level compared to a pattern to be recognized by neurons of a higher group of neurons of a higher hierarchic level, at least a part of the neurons of a respective group of neurons interconnected to one another by means of connections;
wherein the plurality of wires are grouped to at least two groups of wires as bunches of wires, wherein neurons of a respective group of neurons are connected between two groups of wires;
wherein a strength value is associated with a connection between different neurons, the strength value of a particular connection indicative of a likelihood that information which is input to the neurons propagates via a particular connection, the strength value of each connection modifiable based on an amount of traffic of information which is input to the neurons and which propagates via the particular connection and/or is modifiable based on a strength modification impulse; and
a decision taking unit for taking a decision based on a the result of the processing of the perceived information.

15. The device of claim 14, wherein the input unit is adapted for perceiving information related to one or a plurality of different human senses or non-human senses.

16. A method of operating a neural network, the method comprising:
connecting a plurality of neurons by a plurality of wires, wherein at least a part of the plurality of wires comprises a plurality of input connections and exactly one output connection and/or at least a part of the plurality of wires comprises exactly one input connection and a plurality of output connections;
grouping the plurality of neurons to at least two groups of neurons, and arranging the groups of neurons to define a hierarchic structure, a lower group of neurons of a lower hierarchic level adapted to recognize a pattern of information which is input to the neurons of this lower group and which pattern is of a lower level compared to a pattern to be recognized by neurons of a higher group of neurons of a higher hierarchic level;
grouping the plurality of wires to at least two groups of wires as bunches of wires, and connecting neurons of a respective group of neurons between two groups of wires;
using a processor to generate a strength value associated with a connection between different neurons, wherein the strength value of a particular connection is indicative of a likelihood that information which is input to the neurons propagates via the particular connection, the strength value of each connection modifiable based on an amount of traffic of information which is input to the neurons and which propagates via the particular connection and/or modifiable based on a strength modification impulse; and
interconnecting at least a part of the neurons of a respective group of neurons to one another by means of connections.

17. A program element, which, when being executed by a processor, is adapted to control or carry out a method, the method comprising:
connecting a plurality of neurons by a plurality of wires, wherein at least a part of the plurality of wires comprises a plurality of input connections and exactly one output connection and/or at least a part of the plurality of wires comprises exactly one input connection and a plurality of output connections;
grouping the plurality of neurons to at least two groups of neurons, and arranging the groups of neurons to define a hierarchic structure, a lower group of neurons of a lower hierarchic level adapted to recognize a pattern of information which is input to the neurons of this lower group and which pattern is of a lower level compared to a pattern to be recognized by neurons of a higher group of neurons of a higher hierarchic level;
grouping the plurality of wires to at least two groups of wires as bunches of wires, and connecting neurons of a respective group of neurons between two groups of wires;
generating a strength value associated with a connection between different neurons, wherein the strength value of a particular connection is indicative of a likelihood that information which is input to the neurons propagates via the particular connection, the strength value of each connection modifiable based on an amount of traffic of information which is input to the neurons and which propagates via the particular connection and/or modifiable based on a strength modification impulse; and
interconnecting at least a part of the neurons of a respective group of neurons to one another by means of connections.

18. A computer-readable medium, in which a computer program is stored which, when being executed by a processor, is adapted to control or carry out a method of operating a neural network, the method comprising:
connecting a plurality of neurons by a plurality of wires, wherein at least a part of the plurality of wires comprises a plurality of input connections and exactly one output connection and/or at least a part of the plurality of wires comprises exactly one input connection and a plurality of output connections;
grouping the plurality of neurons to at least two groups of neurons, and arranging the groups of neurons to define a hierarchic structure, a lower group of neurons of a lower hierarchic level adapted to recognize a pattern of information which is input to the neurons of this lower group and which pattern is of a lower level compared to a pattern to be recognized by neurons of a higher group of neurons of a higher hierarchic level;
grouping the plurality of wires to at least two groups of wires as bunches of wires, and connecting neurons of a respective group of neurons between two groups of wires;
using the processor to generate a strength value associated with a connection between different neurons, wherein the strength value of a particular connection is indicative of a likelihood that information which is input to the neurons propagates via the particular connection, the strength value of each connection modifiable based on an amount of traffic of information which is input to the neurons and which propagates via the particular connection and/or modifiable based on a strength modification impulse; and interconnecting at least a part of the neurons of a respective group of neurons to one another by means of connections.

* * * * *